US012675584B2

(12) United States Patent
Cooreman

(10) Patent No.: US 12,675,584 B2
(45) Date of Patent: Jul. 7, 2026

(54) APPARATUS FOR CRYPTOGRAPHIC OPERATIONS ON INFORMATION AND ASSOCIATED METHODS

(71) Applicant: Silicon Laboratories Inc., Austin, TX (US)

(72) Inventor: Steven Cooreman, Nittedal (NO)

(73) Assignee: Silicon Laboratories Inc., Austin, TX (US)

( * ) Notice: Subject to any disclaimer, the term of this patent is extended or adjusted under 35 U.S.C. 154(b) by 351 days.

(21) Appl. No.: 17/988,738

(22) Filed: Nov. 16, 2022

(65) Prior Publication Data

US 2024/0160752 A1      May 16, 2024

(51) Int. Cl.
*G06F 21/60* (2013.01)
*G06F 21/31* (2013.01)
*G06F 21/10* (2013.01)

(52) U.S. Cl.
CPC ............ *G06F 21/602* (2013.01); *G06F 21/31* (2013.01); *G06F 21/107* (2023.08)

(58) Field of Classification Search
CPC ....... G06F 21/602; G06F 21/31; G06F 21/107
USPC .......................................................... 726/26
See application file for complete search history.

(56) References Cited

U.S. PATENT DOCUMENTS

| | | | | |
|---|---|---|---|---|
| 10,031,795 | B1 | 7/2018 | Eaton | |
| 11,943,367 | B1 * | 3/2024 | Saravanan | ............ H04L 9/3242 |

| | | | | |
|---|---|---|---|---|
| 11,960,769 | B2 * | 4/2024 | Chen | ..................... G06F 3/0623 |
| 2006/0230274 | A1 * | 10/2006 | Surendran | ............. H04L 9/0625 |
| | | | | 713/176 |
| 2007/0005966 | A1 * | 1/2007 | Aissi | ..................... H04L 9/3239 |
| | | | | 713/168 |
| 2011/0113392 | A1 * | 5/2011 | Chakraborty | ........... G09C 1/00 |
| | | | | 716/102 |
| 2011/0211691 | A1 | 9/2011 | Minematsu | |
| 2016/0358010 | A1 * | 12/2016 | Yang | .................. G06V 40/1353 |
| 2018/0183771 | A1 | 6/2018 | Campagna | |
| 2019/0199517 | A1 * | 6/2019 | Satpathy | ............... H04L 9/0631 |
| 2022/0103338 | A1 * | 3/2022 | Brooker | ............. G06F 21/6218 |
| 2022/0291999 | A1 * | 9/2022 | Dixit | ..................... H04L 9/0894 |

FOREIGN PATENT DOCUMENTS

| | | |
|---|---|---|
| CN | 110365482 A | 10/2019 |
| EP | 1063811 A1 | 12/2000 |
| WO | WO2007129197 A1 | 11/2007 |
| WO | WO2019038634 A1 | 2/2019 |

OTHER PUBLICATIONS

Daniel J. Bernstein, The Poly1305-AES message authentication code, Mar. 29, 2005, 18 pgs. (available currently at https://cr.yp.to/mac/poly1305-20050329.pdf).

(Continued)

*Primary Examiner* — Lan Dai T Truong
(74) *Attorney, Agent, or Firm* — Zagorin Cave LLP

(57) ABSTRACT

An apparatus includes an encryption circuit. The encryption circuit includes a block function circuit to generate a plurality of blocks of output data. A first part of a keystream is generated from a block of output data having an initial sequence number. A second part of the keystream is generated from blocks of output having sequence numbers other than the initial sequence number.

21 Claims, 21 Drawing Sheets

(56)        References Cited

OTHER PUBLICATIONS

Y. Nir et al., RFC 9439: ChaCha20 and Poly1305 for IETF
Protocols, Jun. 2018, 2 pgs.
Y. Nir et al., ChaCha20 and Poly1305 for IETF Protocols, Jun.
2018, 46 pgs.
Office Communication in U.S. Appl. No. 17/988,741, 11 pgs.
Office Communication in U.S. Appl. No. 17/988,741, 10 pgs.

* cited by examiner

APPARATUS FOR CRYPTOGRAPHIC OPERATIONS ON INFORMATION AND ASSOCIATED METHODS

CROSS-REFERENCE TO RELATED APPLICATIONS

"This application is related to U.S. patent application Ser. No. 17/988,741, filed on Nov. 16, 2022, titled Apparatus for Encryption and Decryption of Information and Associated Methods,".

TECHNICAL FIELD

The disclosure relates generally to processing information and, more particularly, to apparatus for encrypting and/or decrypting information, and associated methods.

BACKGROUND

Advances in information processing have resulted in the creation, storage, transport, communication, and use of relatively large amounts of information. Examples include digital information, whether processed locally or though network infrastructures.

With the relatively large amounts of information, demands have also increased for information security, validation, privacy, and/or authentication. Towards those ends, a variety of techniques and apparatus have been developed that allow encrypting, decrypting, and/or authenticating information.

The description in this section and any corresponding figure(s) are included as background information materials. The materials in this section should not be considered as an admission that such materials constitute prior art to the present patent application.

SUMMARY

In an exemplary embodiment, an apparatus includes an encryption circuit. The encryption circuit includes a block function circuit to generate a plurality of blocks of output data. A first part of a keystream is generated from a block of output data having an initial sequence number. A second part of the keystream is generated from blocks of output having sequence numbers other than the initial sequence number.

In another exemplary embodiment, an apparatus includes an encryption circuit. The encryption circuit includes a block function circuit, using a ChaCha20 block functionality, to generate a plurality of blocks of output data having respective sequence numbers. The apparatus also includes a finite state machine (FSM) a finite state machine (FSM) to generate a first part of a keystream from a block of output data having an initial sequence number, and to generate a second part of the keystream from blocks of output having sequence numbers greater than the initial sequence number.

In another exemplary embodiment, a method of encrypting information includes using a block function to generate a plurality of blocks of output data. The method further includes generating a first part of a keystream from a block of output data having an initial sequence number, and generating a second part of the keystream from blocks of output having sequence numbers other than the initial sequence number.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

FIGS. 7-1 to 7-3 show a circuit arrangement for information encryption or decryption.

FIG. 8 shows a circuit arrangement for a system on a chip (SOC).

DETAILED DESCRIPTION

The disclosure relates generally to processing information and, more particularly, to apparatus for encrypting and/or decrypting information, and associated methods. In exemplary embodiments, apparatus and methods for encrypting information, decrypting information, and producing or validating related information (e.g., tags) are provided.

Figure 1:
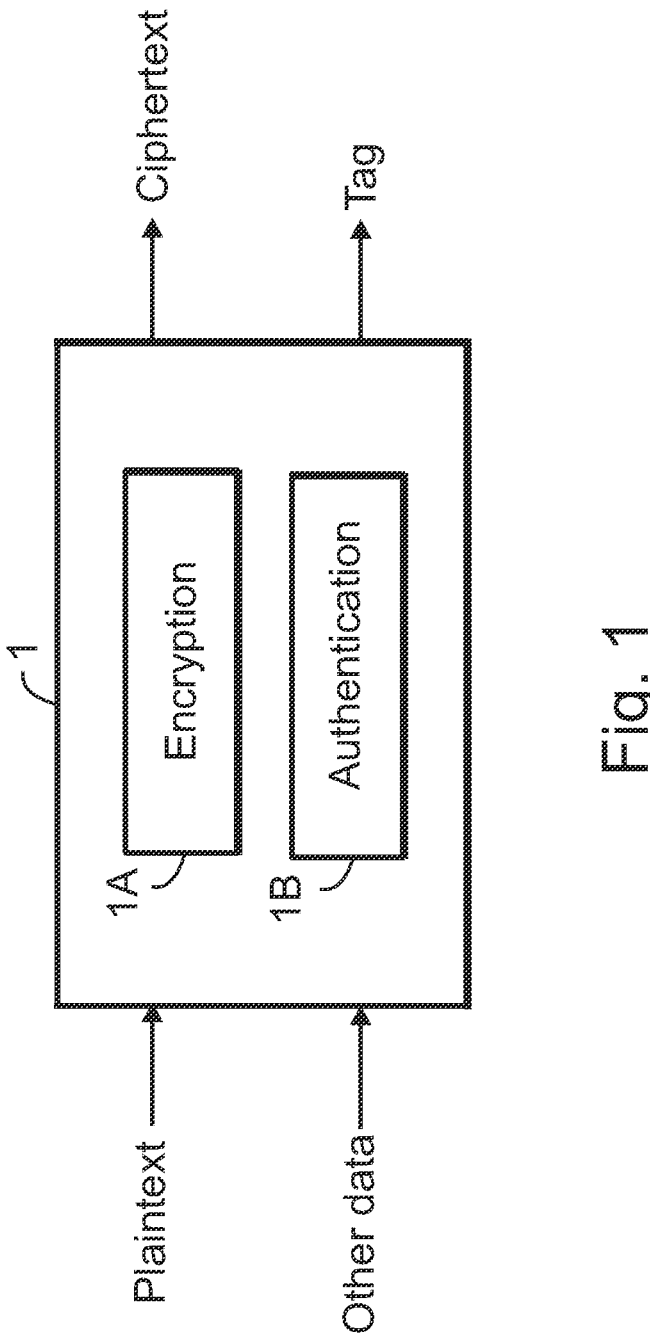
FIG. 1 shows a block diagram of a system (or circuit arrangement) for encrypting information.

FIG. 1 shows a block diagram of a system (or circuit arrangement) 1 for encrypting information according to an exemplary embodiment. The system 1 includes an encryption block (or circuit) 1A, and an authentication block (or circuit) 1B.

The encryption block 1A receives as an input unencrypted data or information, commonly known to persons of ordinary skill in the art as plaintext. The encryption block 1A encrypts the plaintext using a key (not shown) and produces encrypted data or information, commonly known to persons of ordinary skill in the art as ciphertext.

The authentication block 1B receives as an input other data related to the plaintext, for example, metadata in some embodiments. The authentication block 1B generates information, such as a tag (or message authentication code, MAC), based on the input data (in ciphertext or plaintext form, depending on the process used) and the other data or associated data received as an input.

Thus, in exemplary embodiments, the operation performed by the system 1 constitutes authenticated encryption with associated data (AEAD). The ciphertext constitutes the encrypted information or data. The tag constitutes the authentication code, which confirms the authenticity of the associated data and ciphertext in encrypt-then-MAC processes.

As persons of ordinary skill in the art will understand, the tag may be used to confirm that the source of the encrypted information used a correct key to encrypt the information. As noted, the tag is sometimes referred to as the MAC.

Figure 2:
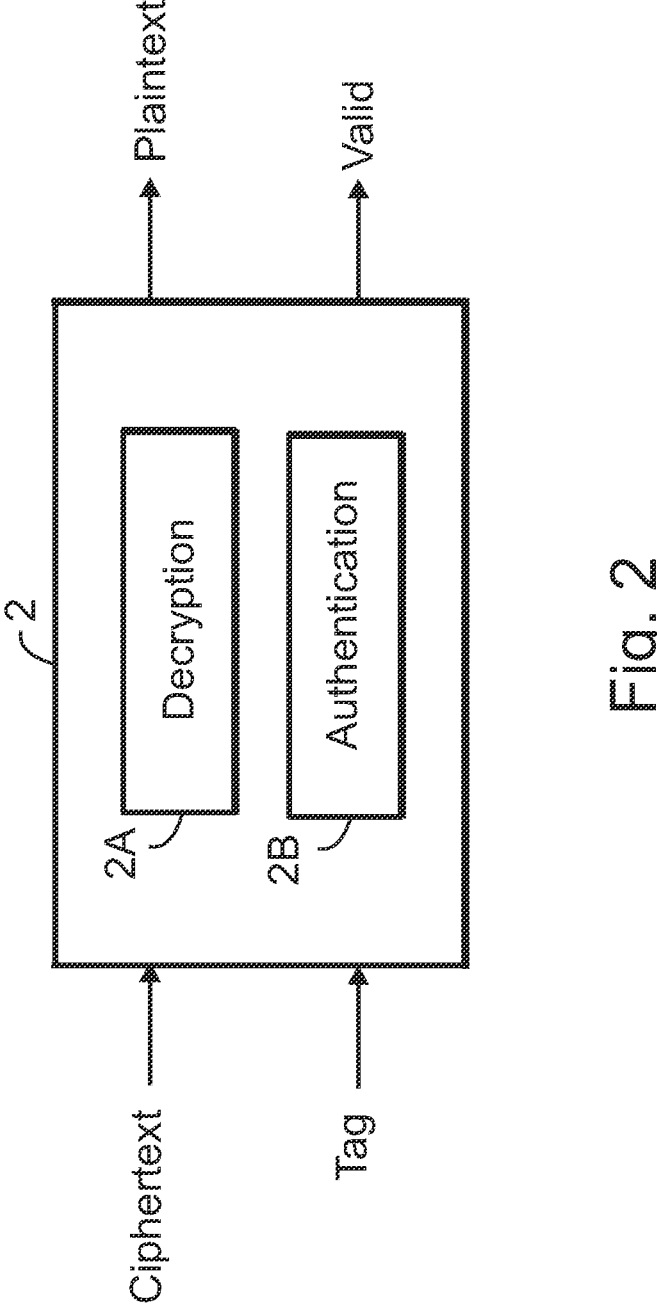
FIG. 2 shows a block diagram of a system (or circuit arrangement) for decrypting information.

FIG. 2 shows a block diagram of a system (or circuit arrangement) 2 for decrypting information according to an exemplary embodiment. The system 2 includes a decryption block (or circuit) 2A, and an authentication block (or circuit) 2B.

The decryption block 2A receives as an input the ciphertext and, using a key (not shown), decrypts the ciphertext to generate plaintext. The authentication block 2B uses the tag to determine whether the correct key was used to encrypt the ciphertext and to authenticate the associated data, and provides an indication of the determination using the valid output.

In addition to the plaintext, ciphertext, and tag, described above, exemplary embodiments use one or more tokens or quantities are used. They include key (used to encrypt/decrypt and authenticate), keystream (generated from the key), initialization vector or IV or nonce (a number used once during the operations), associated data (data or information to be authenticated but not encrypted). The tokens or quantities are understood by person of ordinary skill in the art and are therefore not described further.

Figure 3:
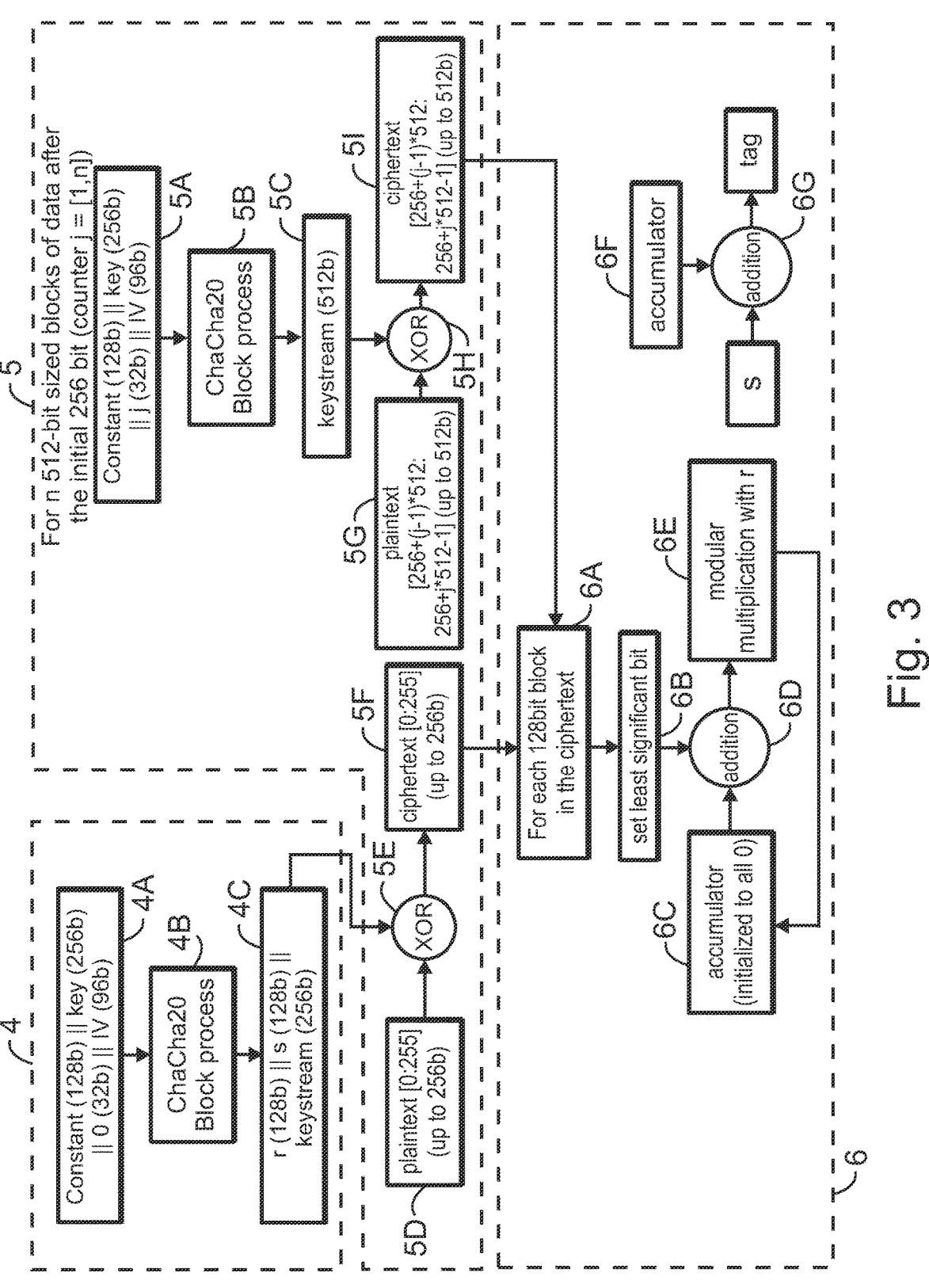
FIG. 3 shows a process for authenticated encryption with associated data (AEAD).

FIG. 3 shows a process for authenticated encryption with associated data (AEAD) according to an exemplary embodiment. As described below in detail, some of the operations in FIG. 3 use blocks or processes employed by the ChaCha20 and Poly1305, more specifically, ChaCha20 as the stream cipher, and Poly1305 as authenticator (for tag or MAC generation), as described in request for comment (RFC) 8439, titled "ChaCha20 and Poly1305 for IETF Protocols," ISSN: 2070-1721, dated June 2018, currently available at https://www.rfc-editor.org/rfc/rfc8439. Information about ChaCha20 and Poly1305 is also currently available at https://www.rfc-editor.org/info/rfc8439. ChaCha20 and Poly1305 are not described further as they are known to persons of ordinary skill in the art.

In exemplary embodiments apparatus and associated methods are provided to allow processing data or information of certain sizes of input data in less time compared to ChaCha20-Poly1305. To do so, keystream bits that are discarded by ChaCha20-Poly1305 are used in exemplary embodiments.

More specifically, in the ChaCha20-Poly1305 implementation, the block with sequence number 0 used for constructing the key for the keyed hash process contains more state than used by ChaCha20-Poly1305. In the specific ChaCha20-Poly1305 case, each block outputs 512 bits of state/keystream, and Poly1305 is keyed using 256 bits of key material. As a result, there are 256 unused bits in the first block (the block with sequence number 0), which are used in exemplary embodiments to increase the speed of the operations (encryption, authentication). Thus, in exemplary embodiments, rather than discarding the remaining 256 bits of ChaCha20 output, as described in RFC 8439 and above, those bits are used as part of the keystream. Effectively, in exemplary embodiments, what is used as the keystream is shifted, and the processing of the encryption operations are moved back or to an earlier point in time.

Note that, as persons of ordinary skill in the art will understand, rather than the block with sequence number 0, generally, in exemplary embodiments, an initial block, i.e., a block having an initial sequence number) may be used, which may or may not have sequence number 0. The sequence number 0 is used in this document to facilitate presentation, and is not intended as a limitation to blocks having sequence number 0. Thus, in exemplary embodiments, blocks may have sequence numbers starting with an initial sequence number (e.g., 0), as desired.

More specifically, the 256 bits of unused output (by ChaCha20-Poly1305) from the initial block (or first block, with block sequence 0 in some embodiments) are used in exemplary embodiments to start encrypting/decrypting information or data, instead of waiting for the next block, that is the block with sequence number 1 (or generally the block after the initial block), to be generated before being able to start to encrypt/decrypt information or data. Thus, if the total amount of encrypted/decrypted data is equal to or less than 256 bits (generally, the remainder of state available in the block with sequence number 0 or generally the initial block), one would generate merely one block (sequence number 0 or the initial block) instead of two blocks (i.e., blocks with sequence numbers 0 and 1, or generally the initial block and the following block). Described more generally, if the total amount of encrypted/decrypted information or data is larger than a whole (including 0) multiple of the block size but less than the whole multiple of the block size plus the amount of state that was available for encryption/decryption in the first block (the block with sequence number 0 or generally the initial block), then in exemplary embodiments one fewer block generation operation would be used compared to the ChaCha20-Poly1305 technique.

Referring again to FIG. 3, at 4 a pseudorandom key for the authentication block is generated. At 4A, a constant (128 bits, in this example, whose value is defined in RFC 8439), the key (used for encryption, 256 bits in this example), a counter initialized to 0, and an IV or nonce (96 bits in this example) are concatenated, as evidenced by the "∥" symbol. The key used in the Poly1305 keyed-hash/MAC/tag generation process consists of two components, r and s (128 bits each in this example), which are generated by transforming the initial counter block 4A (binary concatenation of the 128-bit constant value, the 256-bit key, a 32-bit counter initialized to 0, and a 96-bit nonce) deterministically.

At 4B, the ChaCha20 block process transforms or processes the concatenated input described above into a pseudorandom output, and using the first 128 bits of this output as r, and the subsequent 128 bits as s. At 4C, the output of the ChaCha20 block process or function is deconstructed into the values r (first 128 bits) and s (subsequent 128 bits) for use as key by the Poly1305 process, and the remainder (i.e., the remaining 256 bits) for use as keystream bits. This keystream is provided to the exclusive-OR (XOR) process 5E. The XOR process performs a bitwise XOR operation on its respective inputs to generate ciphertext 5F (ciphertext [0:255] (up to 256 bits)).

At 5, the remainder of the plaintext is encrypted. For n 512-bit sized blocks of plaintext after the initial 256 bits, a counter j counts from 1 (since 0 was used for the initial block at 4) to n. At 5A, a defined constant (128 bits, same as in 4A), the input key (256 bits, constant throughout the process, same as in 4A), the value of j (count value of the counter, 32 bits in this example), and an input IV or nonce (96 bits, constant throughout the process, same as in 4A) are concatenated, and the result is provided to 5B. At 5B, the ChaCha20 block process transforms or processes the concatenated input described above (totaling 512 bits) into a pseudorandom output, which is used as blocks of keystream (512 bits) 5C, which are provided to the XOR process 5H.

Generally, to encrypt the plaintext to generate ciphertext (encrypted data), the plaintext is subject to a binary bitwise XOR operation (as shown in 5E (for the first 256 bits) and 5H (for the remaining bits of plaintext after the initial 256 bits)) with a pseudorandom keystream of the same bitlength as the plaintext. The keystream starts in this implementation with the last 256 bits of output from the initial counter block as generated at 4, and continues with the output generated by transforming the counter blocks 5A with the ChaCha20 transformation 5B into keystream blocks 5C. Keystream blocks are generated in order by incrementing the counter j (starting from 1) at 5A. The total amount of keystream blocks used is the bit length of the plaintext to be processed by 5H (the remainder of the plaintext after the initial bits processed at 5E) divided by the amount of keystream bits available in each block (512 bits in the exemplary embodiment shown) rounded up to an integer number.

The counter blocks at 5A are constructed as the binary concatenation of a defined 128-bit constant value (same value as at 4A), a 256-bit key which remains constant for the entirety of the operation (same value as at 4A), a 32-bit counter initialized to one and incremented for each block generated, and a 96-bit nonce/IV, which remains constant for the entirety of the operation (same value as at 4A). Therefore, the difference between the counter block input between blocks 4 and 5 is the counter value, where the initial block used at 4 has counter value 0, and the block inputs used at 5 have incremental counter values starting from 1.

As many subsequent counter blocks are generated as is desired based on the amount of data which to be encrypted. If, for example, one desires to encrypt 256 bits of data, blocks 5A/5B/5C/5G/5H/5I would not be exercised, and the 256 bits of keystream used are the initial 256 bits extracted from process 4 as described above. As another example, if one desires to encrypt 512 bits of data, the keystream used would be the binary concatenation of the 256 bits of keystream extracted from the process 4, combined with the first 256 bits of output from the process 5A/5B/5C.

In exemplary embodiments, a decryption operation may be provided, as desired, and as noted above. To decrypt (not shown in FIG. 3) data or information, to plaintext, the same keystream as was used to encrypt the data is reconstructed, and a binary bitwise XOR operation is applied between the ciphertext and the keystream, which will result in the plaintext due to the reversible property of the bitwise XOR operation.

Referring again to FIG. 3, at 6 the keyed-hash tag (MAC) is generated, using the Poly1305 process. The keyed-hash tag/MAC value is generated by processing AAD (additional authenticated data, not shown) and ciphertext in 128-bit blocks through the Poly1305 process.

A 128-bit accumulator is initialized to zero at the beginning of the Poly1305 process. Each 128-bit block of AAD (not shown) and ciphertext (6A) is added to the keyed-hash in sequence. Each 128-bit block of AAD or ciphertext (6A) gets its least significant bit set (e.g., to binary 1, at 6B). This adjusted 128-bit block of AAD or ciphertext is added to the accumulator value at 6C, which is initialized to 0 at the beginning of the process. A regular integer addition is performed at 6D. The result of the addition is then multiplied with the 128-bit partial hash key value r using a modular multiplication (modulo a constant, namely $2^{130}-5$ as defined in Poly1305 specifications) at 6E, and the result of that operation is stored as the updated accumulator value at 6C.

When all 128-bit blocks of the AAD and ciphertext have been added to the accumulator as described above, the accumulator value is finalized, i.e., converted to the actual hash/MAC/tag value) by adding the 128-bit partial hash key value s to the accumulator value (now declared as 6F, which equals 6C after all blocks have been processed by 6A/6B/

6D/6E). Note that the outputs produced by exemplary embodiments, such as the embodiment shown in FIG. 3, are different from ChaCha20-Poly1305 outputs due to the different keystream usage, and are therefore not interchangeable.

Figure 4:
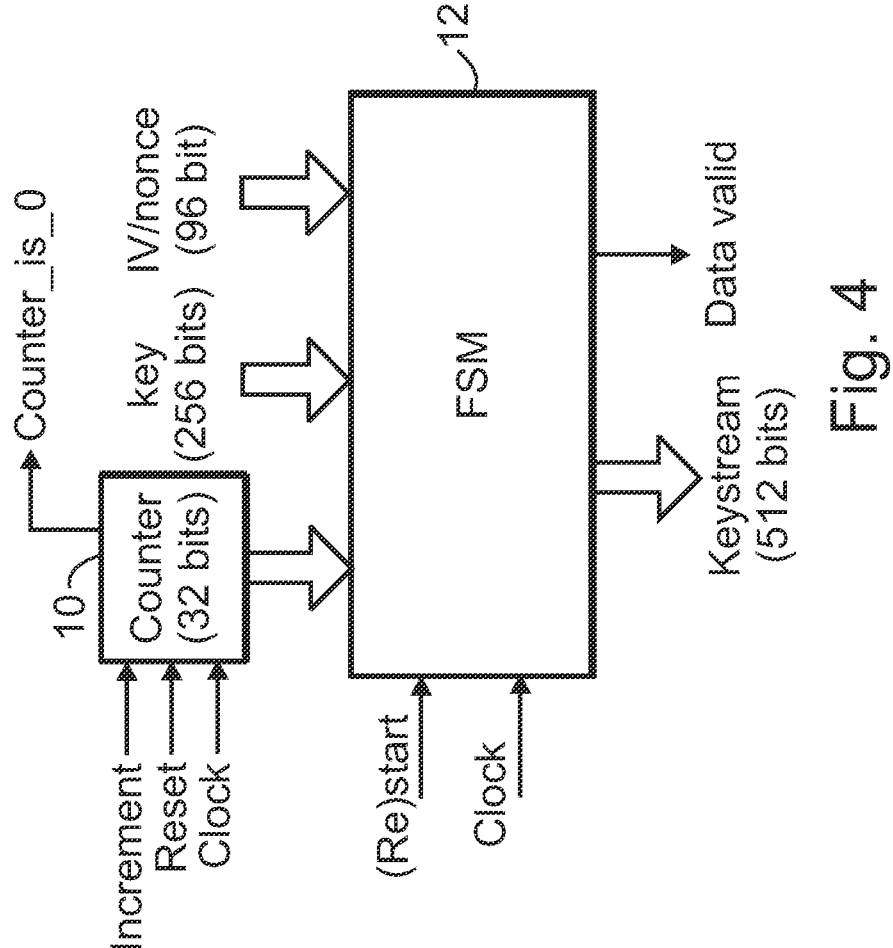
FIG. 4 shows a circuit arrangement for a cryptographically secure transformation operation.

FIG. 4 shows a circuit arrangement according to an exemplary embodiment for a cryptographically secure transformation operation, more specifically, the ChaCha20 block function. The ChaCha20 block function is a cryptographically secure transformation operation, transforming 512 bits of input to 512 bits of output. This operation is irreversible, i.e., if the input is unknown, there is no way to transform the output back into the input which is better than brute force. In the ChaCha20 stream cipher, as described in RFC 8439, it is used to generate the key stream deterministically from a 256-bit secret key and a 96-bit IV/nonce. Since part of the input is a 32-bit counter, each count of the counter results in a different 512 bit output of key stream, meaning each combination of key and IV can generate a keystream for up to $(2^{32}-1) \times 512$ bits (about 256 gigabytes).

The circuit arrangement in FIG. 4 generates 512-bit blocks of state based on a 256-bit key, a 96 bit nonce/IV, and a 32 bit counter 10 which is initialized to zero and increased by one for each generated block. The counter 10 receives increment (to increment the count), reset (to initialize the count to 0), and clock (to clock the counter circuitry) signals.

In the embodiment shown, the counter 10 is a 32-bit binary counter, which is incremented on application of the increment signal and reset to zero on application of the reset signal. It has an output signal counter_is_0 that indicates whether the current counter value is equal to the reset value (i.e., all bits are binary zero).

The count value provided by the counter 10 serves as an input to the finite-state machine (FSM) 12. The FSM 12 also receives the key (256 bits), and the IV/nonce (96 bits). The FSM 12 effectuates a transformation of its inputs (counter value, key and IV/nonce) into pseudorandom output, as described in RFC 8439.

On application of the (Re)start input signal to the FSM 12, the input values described above are latched and the transformation is started. The Data valid signal is reset when the transformation operation starts. When the transformation is finished after some amount of clock cycles of the clock signal provided to the FSM 12, the Data valid signal is set, and the result of the transformation is output as the keystream.

Figure 5:
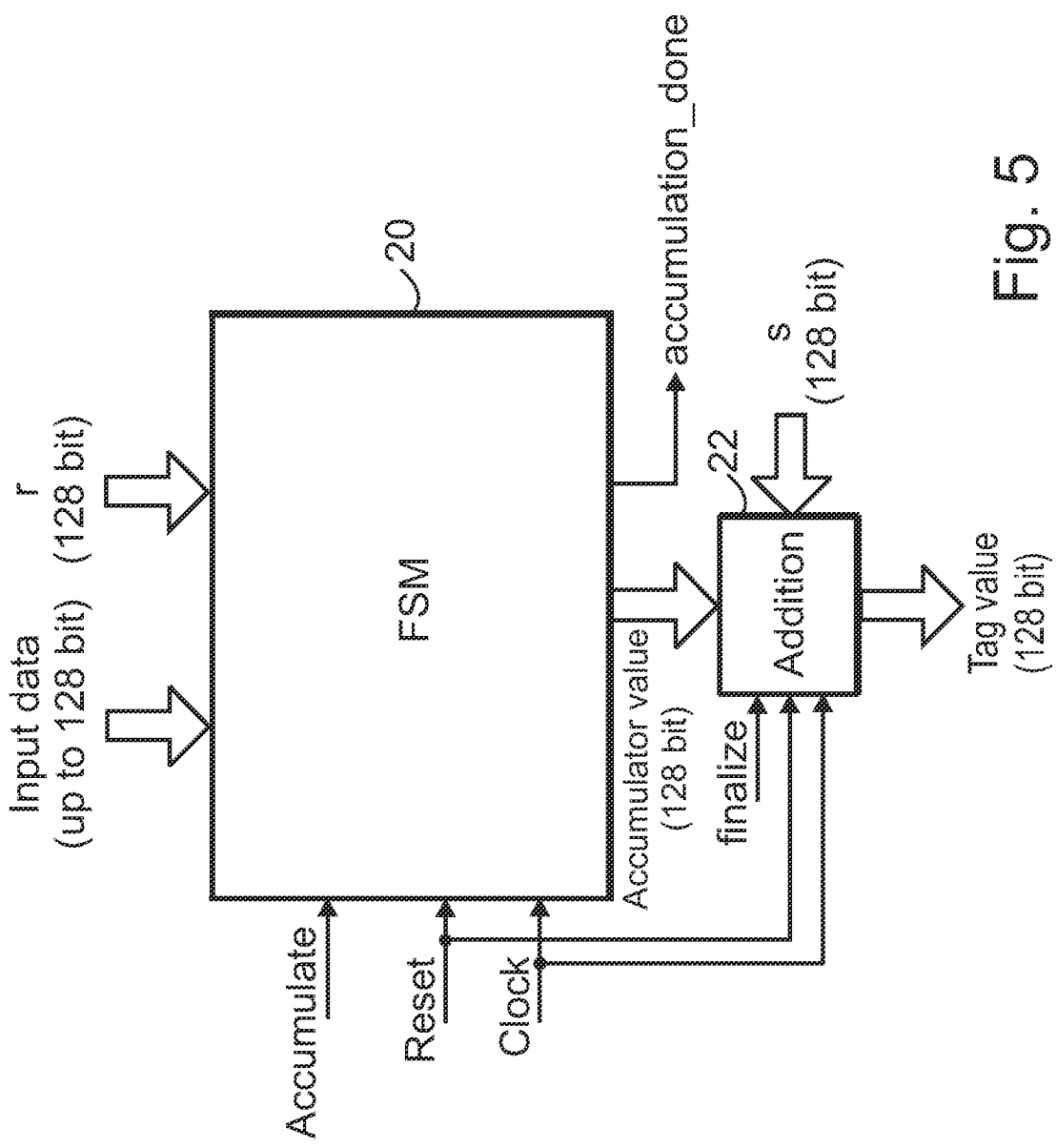
FIG. 5 shows a circuit arrangement for authentication.

FIG. 5 shows a circuit arrangement according to an exemplary embodiment for an authentication operation, specifically the Poly1305 operation. The Poly1305 accumulate-and-multiply function is part of the Poly1305 MAC process. It includes a zero-initialized accumulator and a modular multiplication block, as described above in relation to FIG. 3. For each 128-bit input, the input is clamped, added to the accumulator, and the accumulator is subsequently multiplied with a secret multiplier modulus a constant prime.

Referring again to FIG. 5, an FSM 20 receives as inputs a key (values for r and s) and 128-bit blocks of input data, and outputs the finalized tag (or MAC or keyed hash) value after all 128-bit blocks have been processed. The Poly1305 accumulate-and-multiply block contains the accumulator, addition, and modular multiplication operations for processing 128-bit blocks of the AAD and the ciphertext.

The FSM 20 receives an Accumulate signal (to cause the accumulate function to be performed), a Reset signal (to reset the FSM and also an adder 22 (labeled "Addition"), and a clock signal. On application of the reset signal, the internal 128-bit accumulator of the FSM 20 is reset to all-zero and the latched tag value is reset as well by the adder 20. On application of the Accumulate signal, the accumulation_done signal is reset by the FSM 20. In addition, the accumulation_done signal is set after the following operations are completed: (a) the 128-bit input (with its least significant bit set to binary 1) is added to the accumulator value; and (b) The accumulator value is multiplied with the value of r, using modular multiplication modulo $2^{130} -5$, and the result of the multiplication becomes the new value for the accumulator.

The adder 22 performs an addition operation on the accumulator value from the FSM 20 and the 128-bit s value. On application of the finalize signal, the accumulator value is added to the s value, and the result is output as the tag (or MAC or keyed-hash) value.

Figure 6:
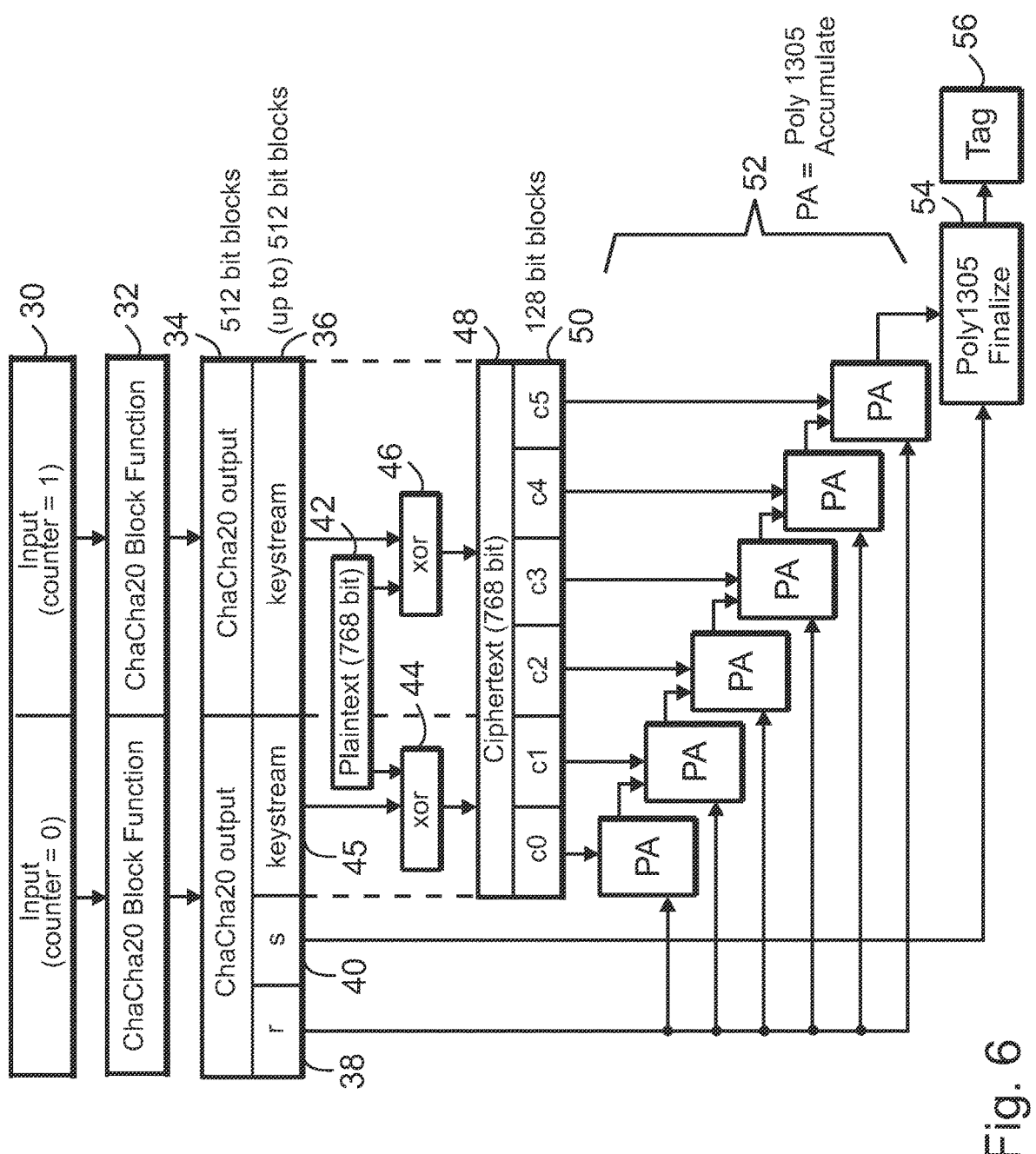
FIG. 6 shows an implementation of information encryption or decryption with authentication.

FIG. 6 shows an implementation of information encryption or decryption according to an exemplary embodiment. At 30, two input counter blocks are shown, as described above in connection with FIG. 3. The input block with counter value 0 corresponds to 4A in FIG. 3, and the input block with counter value 1 corresponds to the first value of 5A in FIG. 3. Note that the construction of these counter blocks is not shown here (refer to FIG. 3). These counter blocks are provided to the ChaCha20 function block 32 (shown as two blocks to correspond to the two applications of the function block). The outputs 34 of the ChaCha20 function block 32 are the transformed 512-bit input blocks, themselves 512-bit blocks. The block resulting from the transformation of the input block with counter value 0 on the left is split in respectively 128, 128 and 256 bits to extract the value r (labeled as 38), the value s (labeled as 40), and a portion of the keystream (labeled as 45). The block shown on the right includes the rest of the keystream (labeled as 36).

The Poly1305 key bits (referred to as values r and s) are generated by deterministically generating them from the initial counter block, i.e., the counter block with counter value 0 (see 4A in FIG. 3). This scheme is performed by taking r as the first 128 bits and s as the subsequent 128 bits of output generated by the ChaCha20 block function on the left, where the input is the counter block with counter value 0, i.e., the binary concatenation of the 128-bit standardized constant from RFC 8439, the 256-bit key, 32 bits of binary zeroes, and 96 bits of IV, as described above and shown in FIG. 3.

Encrypting plaintext 42 to ciphertext 48 (or decrypting ciphertext 48 to plaintext 42) is done by deterministically generating a binary keystream from input counter blocks by using the ChaCha20 block function 32. Since the block functions produces 512 bits of output, there are 512 bits of keystream generated (and can thus process 512 bits of encrypted data) per invocation of the ChaCha20 block function 32. More specifically, let j be a 32-bit unsigned binary counter value, starting at 1. For each 512 bits of data (after processing the initial 256 bits of data with the 256 bits of keystream extracted from the transformation of the initial counter block after extracting r and s), the keystream is generated by using the ChaCha20 function block 32 receiving as input the binary concatenation of the 128-bit standardized constant described in RFC 8439, the 256-bit key, the 32-bit counter value or count j, and the 96 bits of IV.

Transforming plaintext 42 to ciphertext 48 (or ciphertext 48 to plaintext 42) is performed by using a bitwise XOR operation by the XOR blocks 44 and 46 between the input (plaintext 42 or ciphertext 48, depending on whether encrypting or decrypting) and the keystream (shown as parts 45 and 36). After each 512-bit block, the counter j is incremented by 1.

The message integrity code, the tag, is generated from the additional authenticated data (not shown), the (generated or input) ciphertext, and the generated values r and s. To do so, a set of six (for this exemplary embodiment 768 bits of plaintext and no AAD are used, as persons of ordinary skill in the art will understand) Poly1305 accumulate stages 52 are used to receive respective blocks of ciphertext 48, which is represented as six blocks c0-c5 (again, for this exemplary embodiment, which uses 768 bits of plaintext and no AAD, as persons of ordinary skill in the art will understand).

The Poly1305 accumulate stages 52 initialized with accumulator with all-zero values. If there is AAD, an accumulate-and-modular-multiply of each 128-bit block of AAD with r (with the last block zero-extended if the last block if the input length is not a 128-bit multiple; not shown).

If there is no AAD, an accumulate-and-modular-multiply operation is performed on each 128-bit block of ciphertext with r (with the last block zero-extended if the input length is not a 128-bit multiple; not shown). The Poly1305 finalize block 54 finalizes the tag 56 by adding s to the accumulator value (from the Poly1305 accumulate stages 52).

Note that, rather than discarding the remaining 256 bits of ChaCha20 output of the initial sequence block, as described in RFC 8439, those bits are used as part of the keystream (labeled as 45). In other words, the process is optimized by using, rather than discarding, the last 256 bits of output from the initial sequence block as the first 256 bits 45 of the keystream. Thus, the last 256 bits of the initial block are used as part of the keystream. As a result, in exemplary embodiments, the speed of cryptographic operations is optimized compared to ChaCha20. Note further that the message integrity code generation process (generation of the tag 56) is not affected in principle, but that given the same input data (key, IV, AAD, plaintext) this embodiment will generate a different ciphertext and tag value than when processing according to RFC 8439.

Thus, the first 256 bits of data from the ChaCha20 function block 32 can be processed with the first block operation, meaning the upper value of counter j is no longer maps to the amount of 512-bit blocks of plaintext/ciphertext as in RFC 8439, but rather the amount of 512-bit blocks of plaintext/ciphertext following the first 256 bits of plaintext/ciphertext.

Note that, for this technique with plaintext/ciphertext input of size of up to and including 256 bits and without AAD input, the data output and tag can be calculated with a single ChaCha20 function block operation, and up to two accumulate-and-multiply operations, instead of two ChaCha20 block operations and up to two accumulate-and-multiply operations.

Generally, compared to the RFC 8439 implementation, the latency for all data sizes is reduced by removing a ChaCha20 block operation for all data sizes where the remainder of the total bitsize of plaintext/ciphertext divided into 512-bit blocks is less than or equal to 256.

Figures 1, 7:
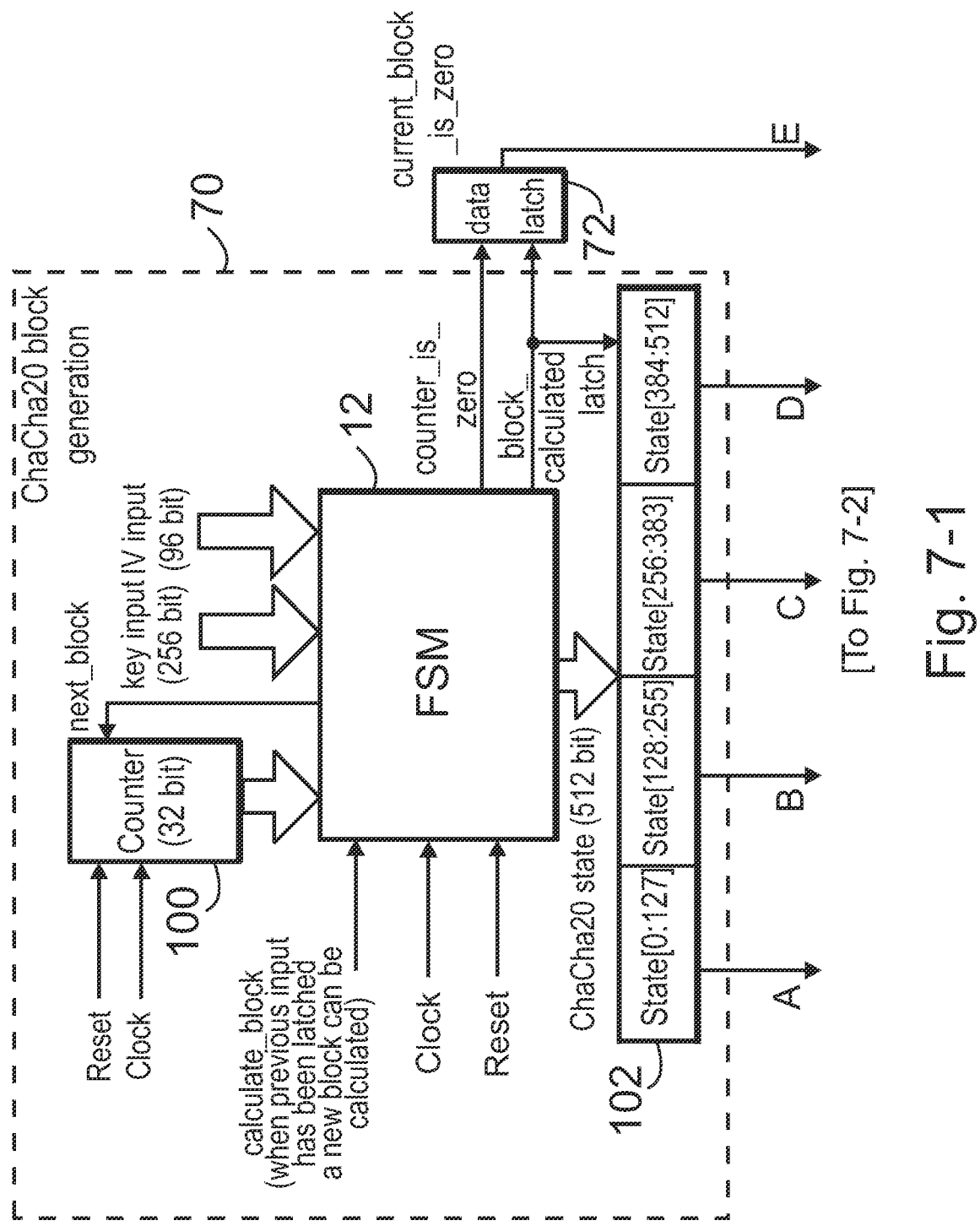
Figures 2, 7:
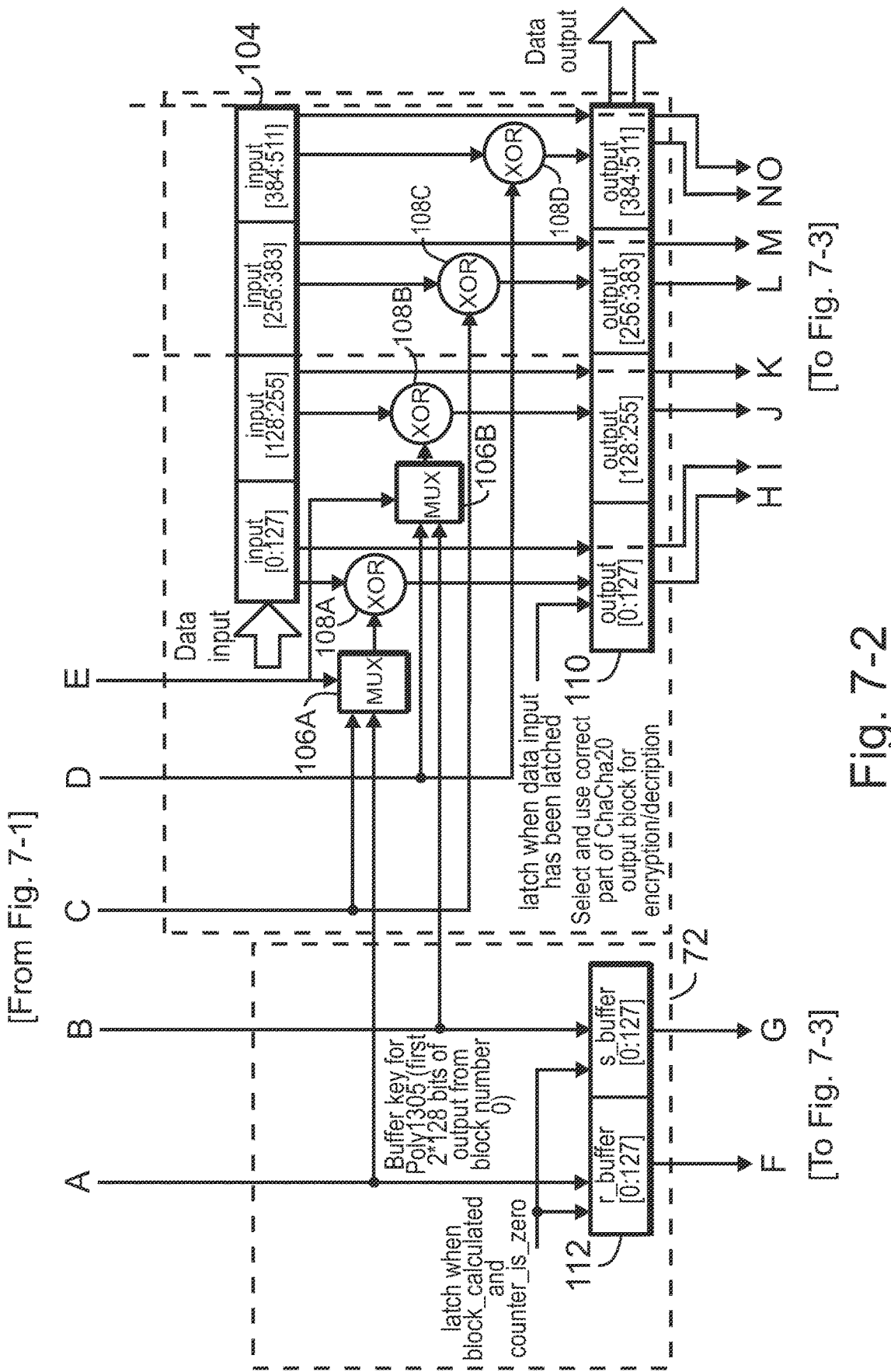
Figures 3, 7:
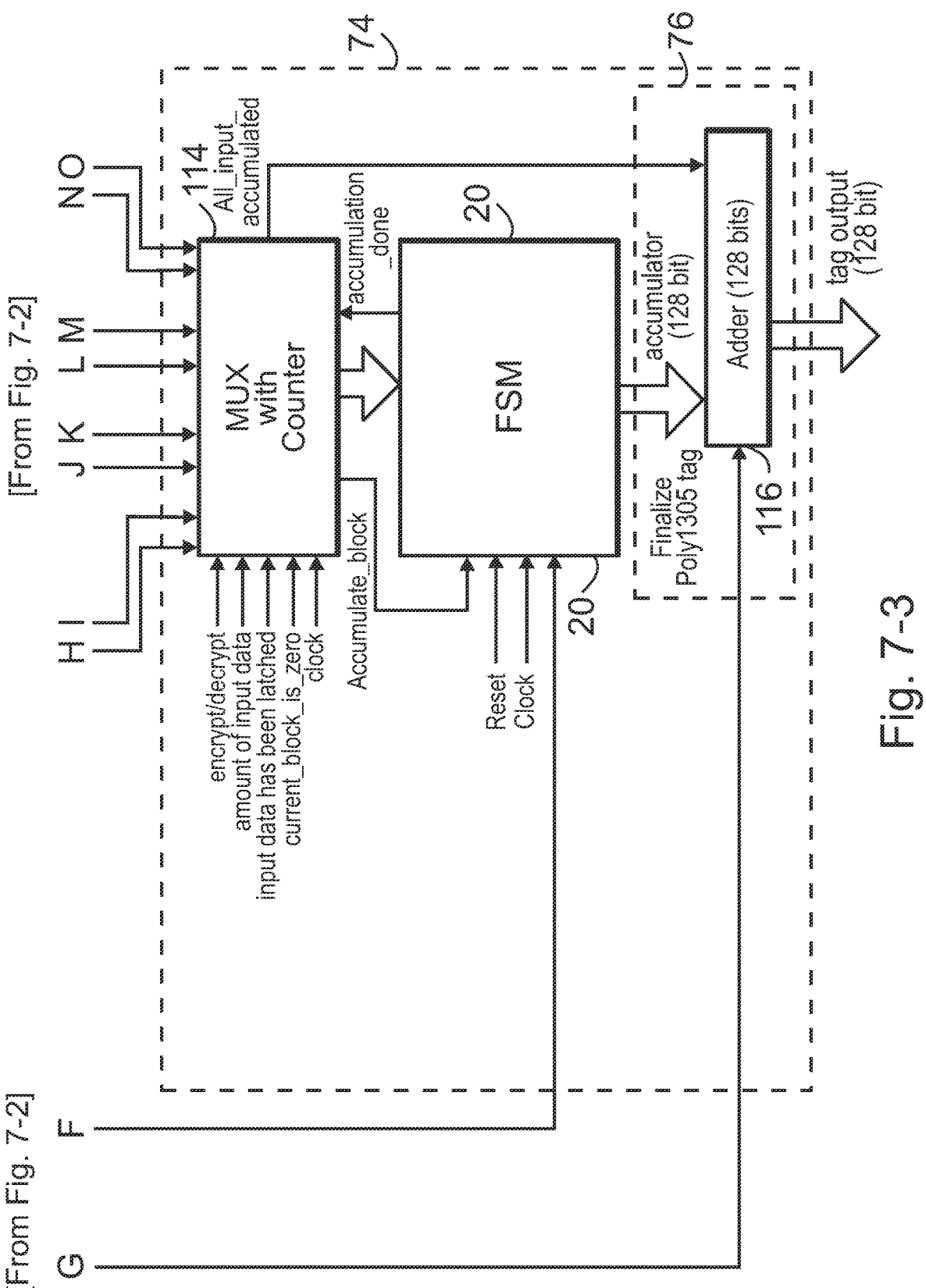

FIGS. 7-1 to 7-3 show a circuit arrangement for information encryption or decryption according to an exemplary embodiment. Overall, the circuit arrangement operates as follows: The ChaCha20 block generation circuit generates ChaCha20 output states for a given key and IV, starting from counter/sequence number 0 (or generally an initial sequence). For the first generated output block (number 0), the first 256 bits of output are latched (stored) and used as r and s values (key) for the Poly1305 keyed hash function.

For the first generated output block (number 0 or generally an initial block), the remaining 256 bits of output are used, rather than discarded, as described above, to process (encrypt/decrypt) two 128-bit sized chunks of data to be encrypted/decrypted, and the ciphertext (encrypted data) parts of those data chunks are successively fed into the Poly1305 processing circuit.

For the remaining size of data to be encrypted/decrypted (after the initial 256 bits processed as part of state block number 0 or generally the initial state block), for each successive 512 bits of data to encrypt/decrypt, (a) new ChaCha20 block is calculated (this calculation can be done in parallel while the previous data is still being processed, as desired); (b) the output state of this block is used to encrypt/decrypt data; and (c) the ciphertext (encrypted data) is fed in successive 128-bit sized chunks to the Poly1305 processing circuit. When all data to be encrypted/decrypted have been processed, the tag is finalized and provided as an output.

Referring to FIG. 7-1, a block generator 70 for the ChaCha20 function includes a counter 100 (32 bits in the example shown). The counter 100, receives a reset signal (to reset the counter to 0), and a next_block signal (from the FSM 12) to increment the count in response to a clock signal. In addition to the 32-bit output of the counter 100, the FSM 12 receives the key (256 bits), and the IV (96 bits). The FSM is clocked by a clock signal, and reset (the output states are reset) by a reset signal.

In response to a calculate_block signal, the FSM 12 calculates a ChaCha20 block, and provides a 512-bit ChaCha20 state to a state register 102. The register 102 latches the state values in response to a block_calculated signal from the FSM 12. Also in response to the block_calculated signal, a latch 71 latches a counter_is_zero (signifies that the count value from the counter 100 is zero). The latch 71 provides a current_block_is_zero (i.e., the current block is a block with sequence number 0 or, generally, the initial block) output signal.

Referring to FIG. 7-2, a key buffer circuit 72 buffers the key for Poly1305 operations. Parts of the state value (bits 0:127 and 128:255) from the state register 102 are provided to a buffer 112 that includes an r_buffer (for the r value) 112 and an s_buffer (for the s value) 72, respectively. The remaining bits of the state value are provided to a multiplexer (MUX) 106A, a MUX 106B, and XOR gates or circuits 108A-108D, as shown in the figure. The input data (plaintext in the case of an encryption operation), labeled as "Data input," are provided to an input register 104.

The current_block_is_zero signal from the latch 71 (see FIG. 7-1) is used as the select signal for MUXes 106A-106B. More specifically, when the current_block_is_zero signal is high (i.e. the output of the block transformation is the result of processing the block with sequence number 0 or generally the initial block), the state of C and D are used as keystream bits for processing the input [0:127] and [128:255](the first 256 bits of plaintext/ciphertext). Input[256:383] and input[384:511] are not used at this point. When the signal current_block_is_zero is low, all XOR circuits 108A, 108B, 108C and 108D are used (i.e. the bits contained in 102 are the result of transforming the counter block with the sequence numbers 1 through j), meaning at that point the circuit is processing the remainder of the input plaintext/ciphertext after the first 256 bits (processed earlier) in 512-bit blocks at a time (all input bits are used and 108A/108B/108C and 108D are active).

An output register 110 latches proper values for the output data. The output data are labeled "Data output" in the figure.

The output data include the ciphertext or the plaintext, depending on whether performing encryption or decryption, respectively. Note that the latched output data include parts of the input data as well as the values provided from the XOR circuits 108A-108D.

Referring to FIG. 7-3, a Poly1305 processing circuit is illustrated. The circuit includes a MUX with counter (MWC) 114, which receives as inputs various signals/values from the circuit in FIG. 7-2, as shown. The MWC operates in response to various input/control signals, as shown.

The MWC 114 selects one block from either the input (decrypt or AAD) or output (encrypt) at a time, and feeds that block to the FSM 20 for accumulation (flagged via the accumulate_block signal provided to the FSM 20). The FSM 20 uses a signal accumulation_done to indicate that the accumulation has been performed.

The amount of data fed to the FSM 20 depends on how many data blocks are processed. In some embodiments, the amount is 1-2 blocks if the state block number is 0, and 1-4 blocks if the state block number is not zero. When all of the input blocks have been processed, the MWC 114 provides a signal all_input_accumulated to the adder 116 in the tag finalization circuit 76. In response to that signal, the adder 116 adds the value r to the accumulated value from the FSM 20 to generate and output the tag.

Figure 8:
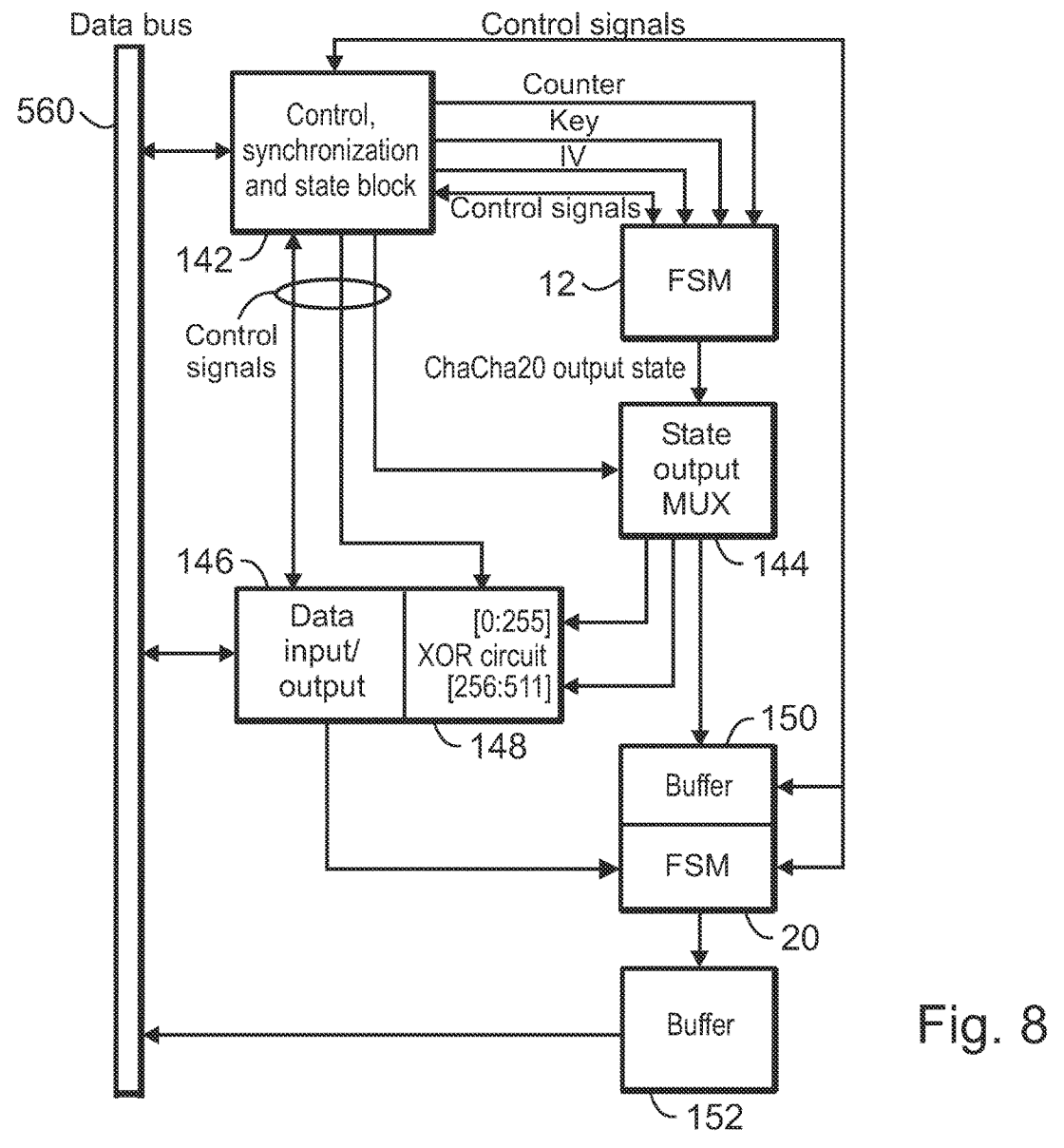

FIG. 8 shows a circuit arrangement for a system on a chip (SOC) according to an exemplary embodiment. Some components of the SOC, such as the FSM 12 and the FSM 20 function as described above. The SOC includes a state output MUX 144. To optimize the speed of cryptographic operations compared to ChaCha20, the state output MUX has more possible output redirections (i.e., the input may be selectively routed to more outputs). This concept is described above in connection with FIGS. 3 and 7-1 through 7-3.

The SOC further includes the FSM 12, which feeds ChaCha20 output state to the state output MUX 144. The SOC also includes a control, synchronization, and state block circuit (collectively "controller) 142. The controller 142 is responsible for tying the various circuit blocks together such that they work coherently in regards to routing input/output data, clocking and synchronization (e.g., not starting the next operation until the current operation is done, and taking care of pipeline timing).

The controller 142 also includes the register interface for the operation of the various blocks in FIG. 8. It includes, for example, registers for setting (e.g., by the user of the SOC) the values for the key and IV, as well as command registers (e.g., commands to start/finalize processing of AAD and data, and set data direction (encryption versus decryption).

The controller 142 provides the Counter, Key, and IV signals to the FSM 12. The controller 142 also exchanges control signals with the FSM 12. The controller 142 further uses control signals to control the operation of state output MUX 144. The control signals serve as the select signals of the state output MUX 144. The state output MUX is responsible for correct routing of the results or output of the ChaCha20 transformation, that is, extracting the values r and s from the initial output, directing the initial 256 bits of keystream to the XOR circuit 148, and directing blocks subsequent to the first block to the XOR circuit 148.

The controller 142 further provides control signals to data input/output circuitry 146 and XOR circuitry 148. The data input/output circuitry 146 either receives input data (e.g., plaintext) or provides output data (e.g., ciphertext). In exemplary embodiments, the data input/output circuitry 146 may include a register interface or a direct memory access (DMA) circuit, which receives/fetches data to be processed as either AAD or ciphertext/plaintext, and exposes/pushes the processed data after processing. The data input/output circuitry 146 also keeps track of the amount of data processed together with the XOR engine.

The XOR circuitry 148 performs the XOR operation, described above, to transform ciphertext to plaintext or vice versa. The data for those operations are provided by the data input/output circuit 146, and the results of the operations are provided to the data bus 560 by the data input/output circuit 146. Note that the XOR circuit 148 also keeps track of how many bytes of keystream have been consumed by the transformation, and allows 'half' keystream block input of 256 bits in addition to the full 512 bit blocks to support using the last 256 bits of the initial block as keystream, as described above.

The controller 142, the data input/output circuitry 146, and the buffer 152 are also coupled to a data bus 560. As a result, those circuits may communicate with other circuitry (not shown) present in or on the SOC, such as processors, memory, control circuits, etc., as persons of ordinary skill in the art will understand.

The controller 142 further controls the buffer 150 and the FSM 20. The buffer 150 receives state information from state output MUX 144, i.e., it buffers Poly1305 key information or data, r and s, extracted from the initial transformed block, as described above.

The FSM 20 provides accumulator information (as described above). The finalization of the tag is triggered by the controller 142 when all of the data have been processed. A buffer 152 buffers the output of the FSM 20, i.e., it buffers the Poly1305 finalized tag or MAC. In some embodiments, the buffer 152 allows for pipelining. The tag may be read via the data bus 140, or may be appended to the output data by the data input/output circuit 146, as desired.

Note that the controller 142 and the data input/output circuit 146 take into account that the amount of data processed by the first output block (block with sequence number 0 or generally the initial block) is up to and including 256 bits long, instead of the full 512 bits, as is the case for subsequent blocks.

Note further that the SOC may be implemented as a stream processor (inline with the data flow), as desired, by making appropriate modifications, as persons of ordinary skill in the art would understand. For example, the controller 142 might be more stand-alone than controlled by another host, processor, etc., and the data input/output circuit 146 and tag/MAC input/output circuitry would be inline instead of coupled to a data bus.

Note that the concepts described above may be generalized to a case where the last number of bits, say, bits in the range [n:m] bits of the initial keystream may be used for processing. In that case, n ranges from 1 through m, and m ranges from 1 through what is left of the initial key stream block after subtracting the bits used for the MAC keys (the maximum m value equals the block output size minus the tag/MAC key size). The case where n equals 0 and m has its maximum value is described above, as persons of ordinary skill in the art will understand.

Note further that the concepts described above may also be applied to other AEAD constructs consisting of a stream cipher and a MAC function, as long as the block size of the stream cipher is larger than the size of the key for the MAC function. In the embodiments described above, document, the block function used is the ChaCha20 block function, which has a 512-bit output, and the MAC function used is Poly1305, which uses a 256-bit single-use key. As persons of ordinary skill in the art will understand, however, other block functions and/or MAC functions may be used, as desired, by making appropriate modifications. FIGS. 9-12 provide some examples.

Figure 9:
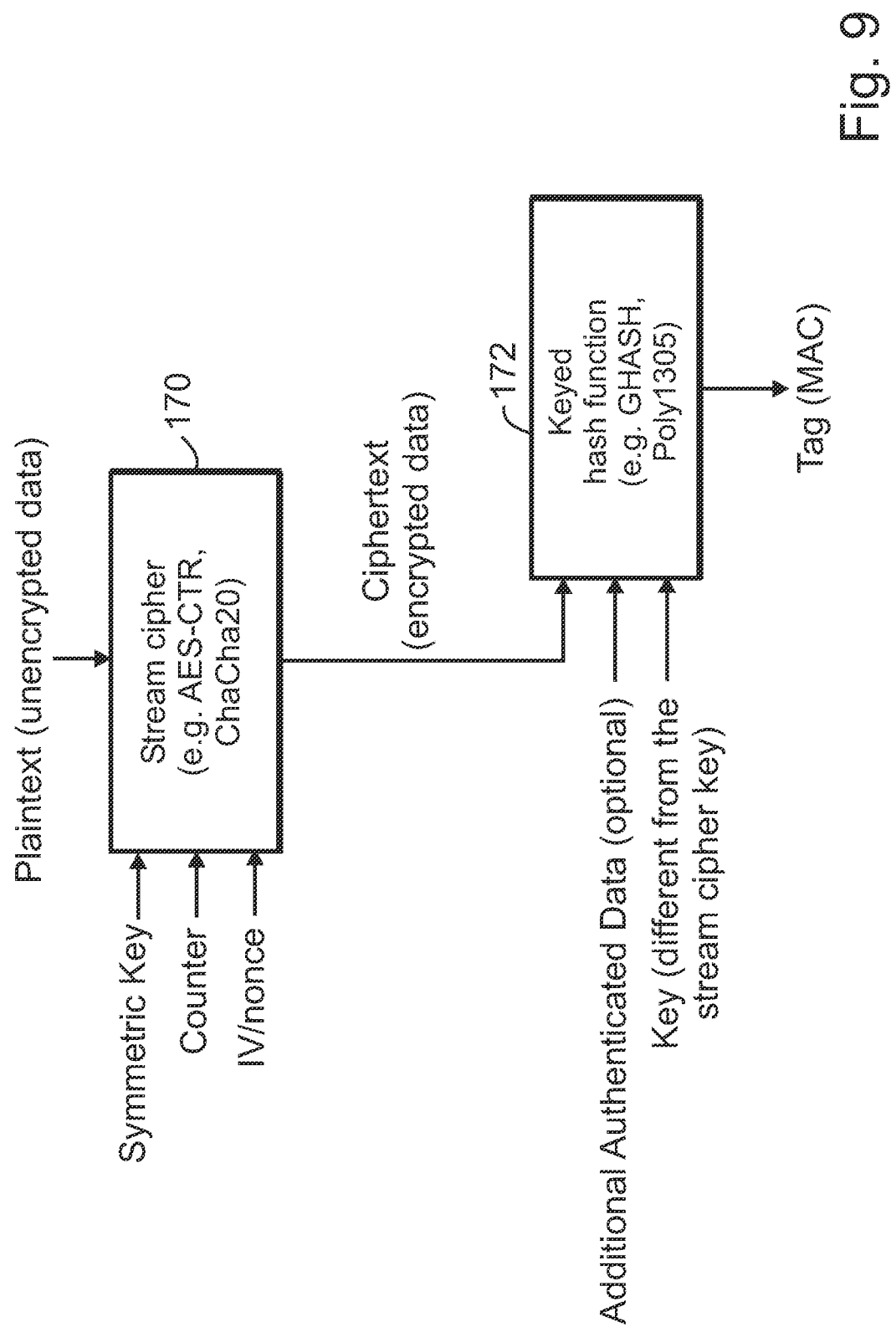
FIGS. 9-10 show conventional encryption and decryption schemes.

FIG. 9 shows a conventional encryption scheme. More specifically, FIG. 9 illustrates an encrypt-then-MAC AEAD construct. The plaintext is encrypted by stream cipher 170 (e.g., AES-CTR (advanced encryption standard-counter mode), ChaCha20), using a symmetric key, a counter value, and an IV, to generate ciphertext. The ciphertext is used by a keyed hash function 172 (e.g., GHASH, Poly1305) to generate the tag, using optional additional authenticated data and a key (different from the stream cipher's symmetric key).

Figure 10:
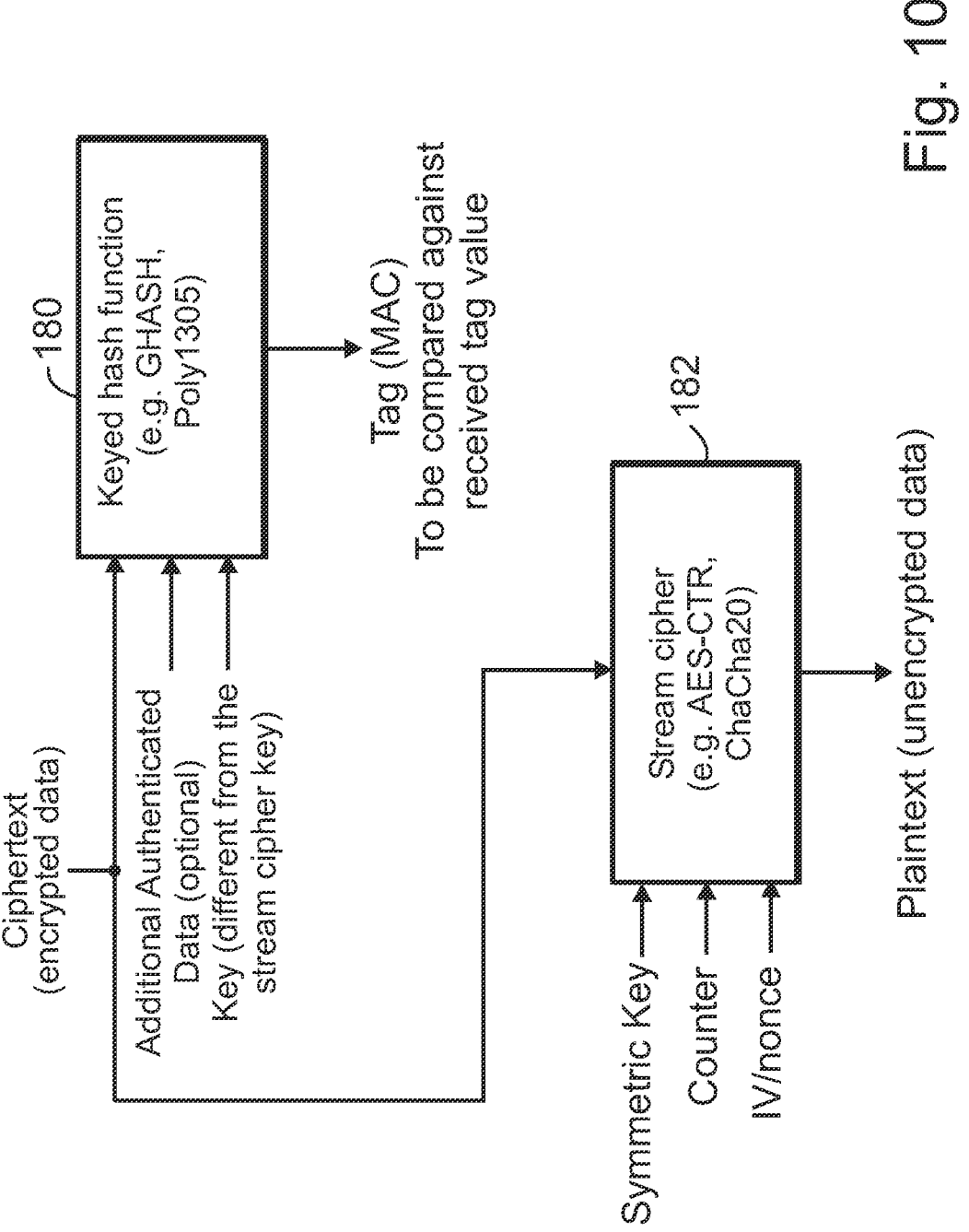

FIG. 10 shows a conventional decryption scheme. More specifically, the decryption scheme decrypts information encrypted using the scheme shown in FIG. 9. Referring to FIG. 10, the ciphertext is provided to keyed hash function 180 (e.g., GHASH, Poly1305) and a stream cipher 182 (e.g., AES-CTR, ChaCha20).

The keyed hash function 180 uses optional authenticated data and a key (different from the stream cipher's symmetric key) to generate a tag to be compared against a received tag value. The stream cipher 182 uses a symmetric key, a counter value, and an IV, to generate plaintext from the ciphertext.

Figure 11:
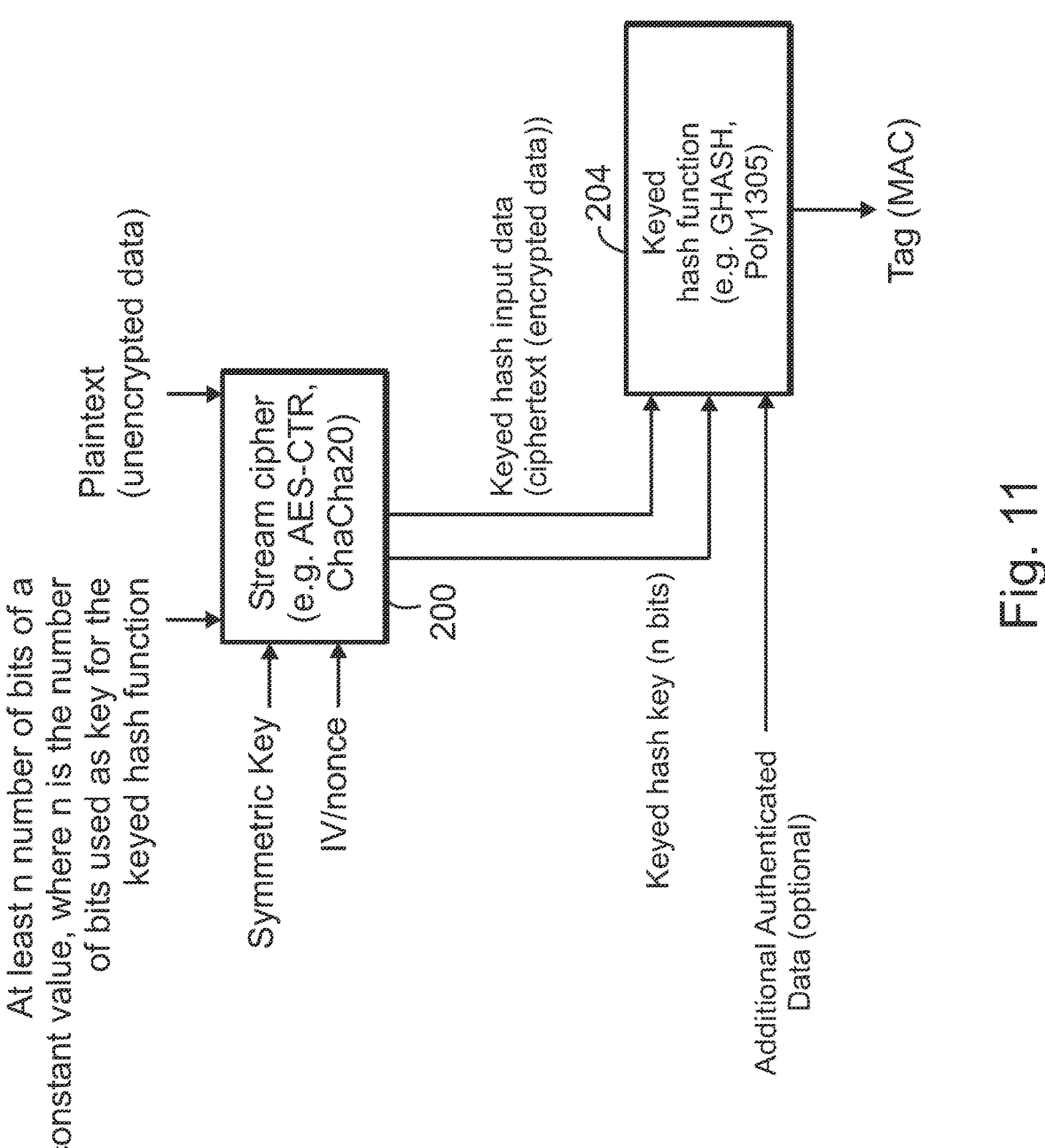
FIGS. 11-12 show generalized encryption and decryption schemes.
Figure 12:
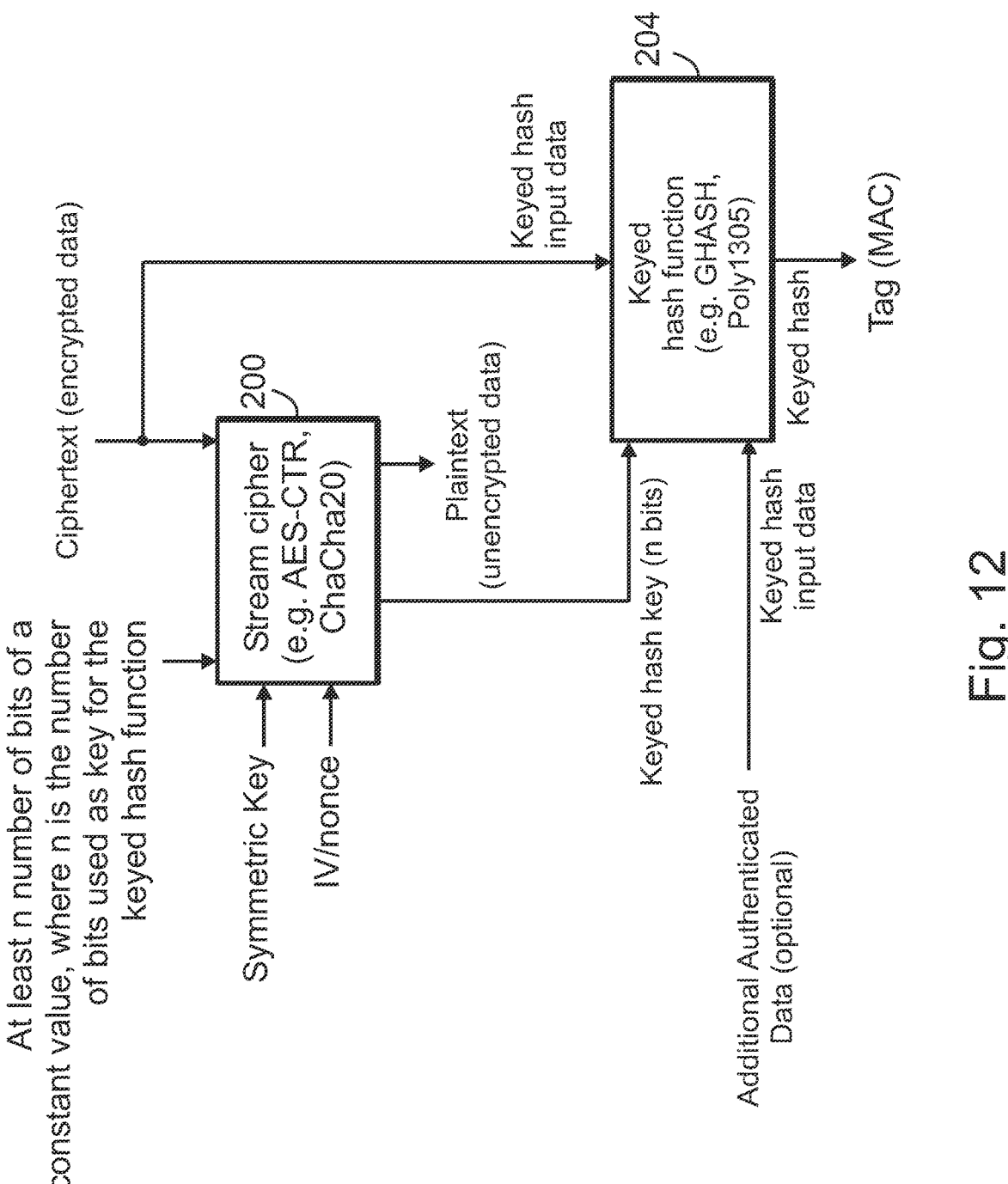

Referring to the exemplary embodiments in FIGS. 11-12, key generation is done differently than as described in RFC 8439. More specifically, a stream cipher is built from a block primitive, based on the techniques and processes shown in FIG. 3 and described above (including implementation according to exemplary embodiments, as also described above), as persons of ordinary skill in the art will understand, by using, rather than discarding, 256 bits of information, as described above in detail. FIG. 11 shows a generalized authenticated encryption circuit arrangement according to an exemplary embodiment. More specifically, FIG. 11 illustrates an encrypt-then-MAC AEAD construct with pseudorandom generation of the hash key. Rather than taking in a separate key for the keyed-hash function as in FIG. 9, it generates that key by leveraging a block cipher to generate the keyed-hash key deterministically.

Referring again to FIG. 11, the stream cipher 200 receives as an input the plaintext. In addition, the stream cipher 200 receives as another input at least n number of bits of a constant value, where n is the number of bits used as the key for the keyed hash function circuit 204. Put another way, the stream cipher 200 receives as its cipher data input a binary concatenation of the plaintext and the at least n number of bits, mentioned above.

The stream cipher 200 generates cipher data output. The cipher data output is split into two parts, the ciphertext, and the keyed hash key, plus a discarded portion. Put another way, the stream cipher 200 provides as outputs a binary de-concatenation of the cipher data into keyed hash key (n bits long) and the ciphertext. A number of bits equal to the number of constant bits in the input to the cipher stream 200 exceeding the value n are discarded. The ciphertext is provided to the keyed hash function 204 as keyed hash input data. The keyed hash key (n bits long) is also provided to the keyed hash function 204. Using optional additional authenticated data provided as an input, the keyed hash function 204 generates the tag (or MAC).

FIG. 12 shows a generalized decryption circuit arrangement according to an exemplary embodiment. More specifically, FIG. 12 illustrates a decryption scheme corresponding to the encrypt-then-MAC AEAD construct with pseudorandom generation of the hash key shown in FIG. 11. Referring to FIG. 12, rather than taking in a separate key for the keyed-hash function as in FIG. 10, it generates that key by leveraging a block cipher to generate the keyed-hash key deterministically.

Referring to FIG. 12 again, the stream cipher 200 receives as an input the ciphertext. In addition, the stream cipher 200 receives as another input at least n number of bits of a constant value, where n is the number of bits used as the key for the keyed hash function circuit 204. Put another way, the stream cipher 200 receives as its cipher data input a binary concatenation of the ciphertext and the at least n number of bits, mentioned above.

The stream cipher 200 generates cipher data output. The cipher data output is split into two parts, the plaintext, and the keyed hash key, plus a discarded portion. Put another way, the stream cipher 200 provides as outputs a binary de-concatenation of the cipher data into keyed hash key (n bits long) and the plaintext. A number of bits equal to the number of constant bits in the input to the cipher stream 200 exceeding the value n are discarded. The plaintext is provided to the keyed hash function 204 as keyed hash input data. The keyed hash key (n bits long) is also provided to the keyed hash function 204. Using optional additional authenticated data provided as an input, the keyed hash function 204 generates the tag (or MAC).

Note that in exemplary embodiments the stream ciphers circuits 200 in FIGS. 11 and 12 may or may not use the same cipher circuit or provide the same cipher functionality (it is understood that "stream cipher" means "stream cipher constructed with a block cipher primitive"). Note further that in exemplary embodiments the keyed hash function circuits 204 in FIGS. 11 and 12 may or not use or provide the same keyed hash functionality or circuitry.

Figure 13:
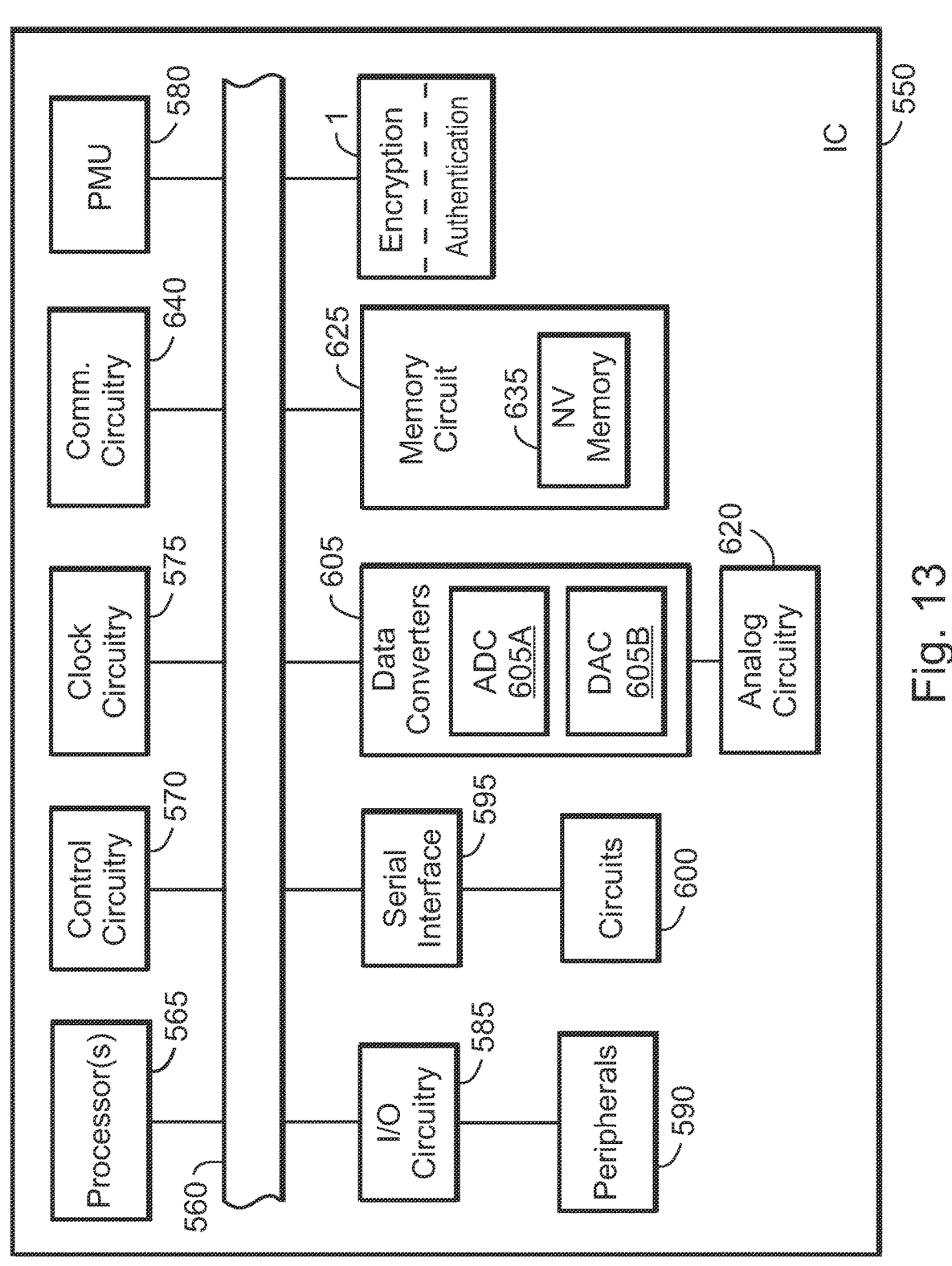
FIGS. 13-15 show circuit arrangement for integrated circuits (ICs), including cryptographic functionality.

According to one aspect of the disclosure, circuitry providing cryptographic functionality, such as encryption, decryption, and authentication, described above, may be used in a variety of circuits, blocks, subsystems, and/or systems. For example, in some embodiments, such circuitry may be integrated in an IC, such as a microcontroller unit (MCU), to provide cryptographic functionality. FIG. 13 shows a block diagram of an IC 550 according to an exemplary embodiment.

The circuit arrangement includes an IC 550, which constitutes or includes an MCU. IC 550 includes a number of blocks (e.g., processor(s) 565, data converter 605, 1/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 includes cryptographic circuitry 1. In the exemplary embodiment shown, cryptographic circuitry 1 performs encryption functionality, as described above. Optionally, in some embodiments, cryptographic circuitry 1 may perform authentication functionality, as described above. The cryptographic circuitry 1 is coupled to link 560, through which it can provide or receive information or data (e.g., information to be encrypted and/or authenticated, or the result(s) of such operation(s)), control signals, and/or status signals, as desired.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as the cryptographic circuitry 1, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to the control or configuration of cryptographic circuitry 1.

Figure 14:
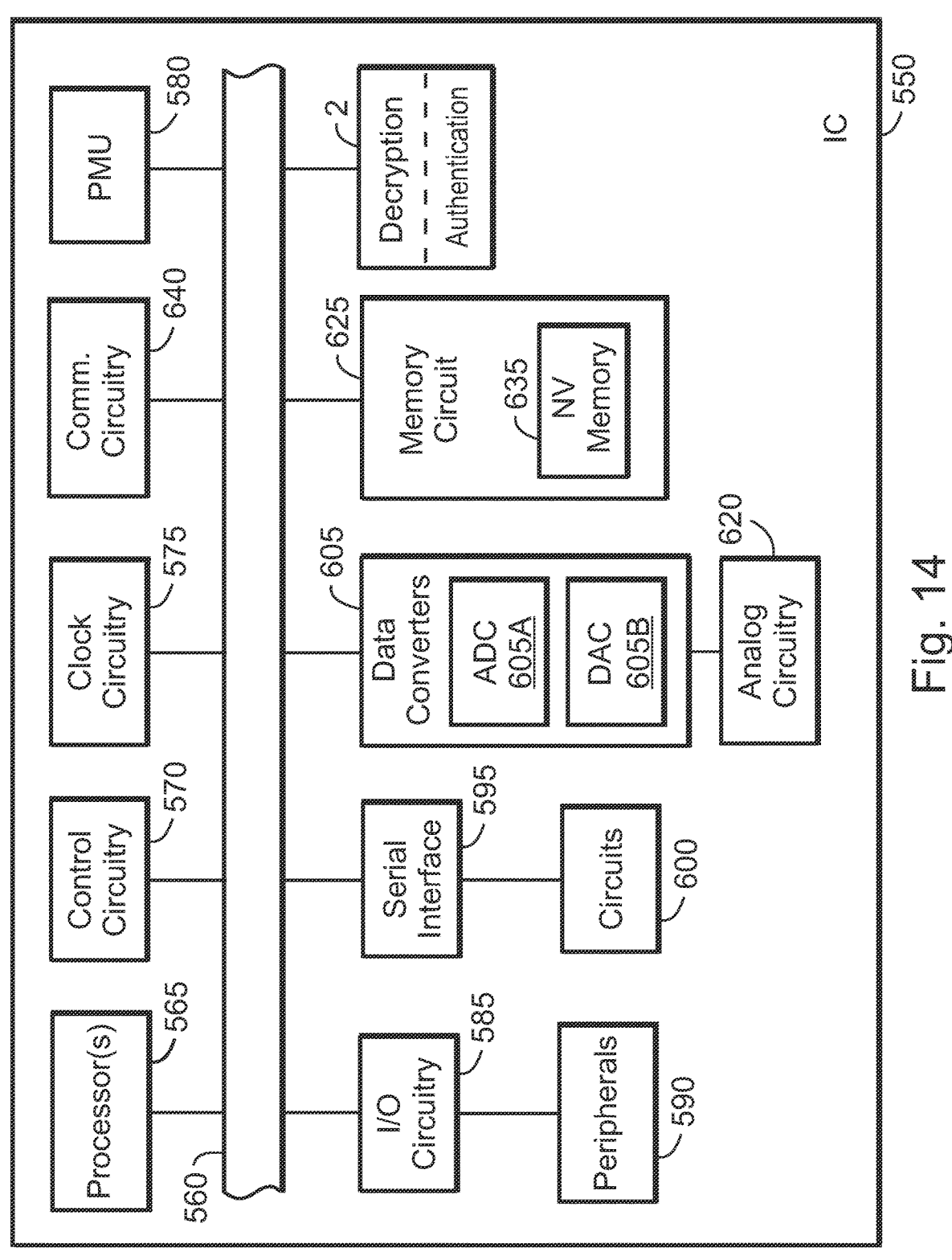

FIG. 14 shows a block diagram of an IC 550 according to another exemplary embodiment. Similar to FIG. 13, the IC 550 in FIG. 14 includes cryptographic circuitry 2. In the exemplary embodiment shown, cryptographic circuitry 2 performs encryption functionality, as described above. Optionally, in some embodiments, cryptographic circuitry 2 may perform authentication functionality, as described above. The cryptographic circuitry 2 is coupled to link 560, through which it can provide or receive information or data (e.g., information to be decrypted and/or authenticated, or the result(s) of such operation(s)), control signals, and/or status signals, as desired.

Figure 15:
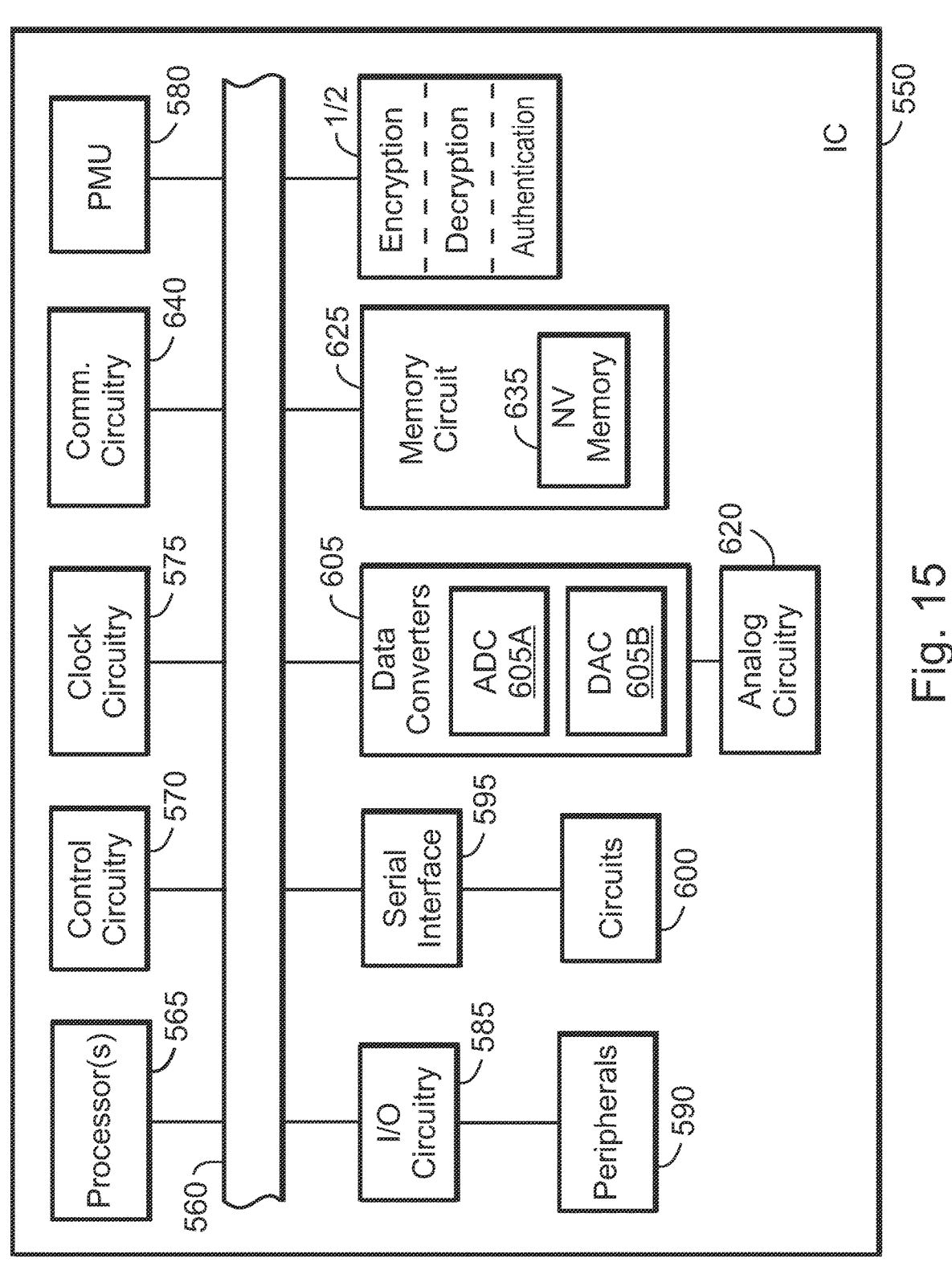

FIG. 15 shows a block diagram of an IC 550 according to another exemplary embodiment. The IC 550 in FIG. 15 includes cryptographic circuitry ½. In the exemplary embodiment shown, cryptographic circuitry ½ performs encryption and decryption functionality, as described above. Optionally, in some embodiments, cryptographic circuitry ½ may perform authentication functionality, as described above. The cryptographic circuitry ½ is coupled to link 560, through which it can provide or receive information or data (e.g., information to be encrypted, decrypted, and/or authenticated, or the result(s) of such operation(s)), control signals, and/or status signals, as desired.

Figure 16:
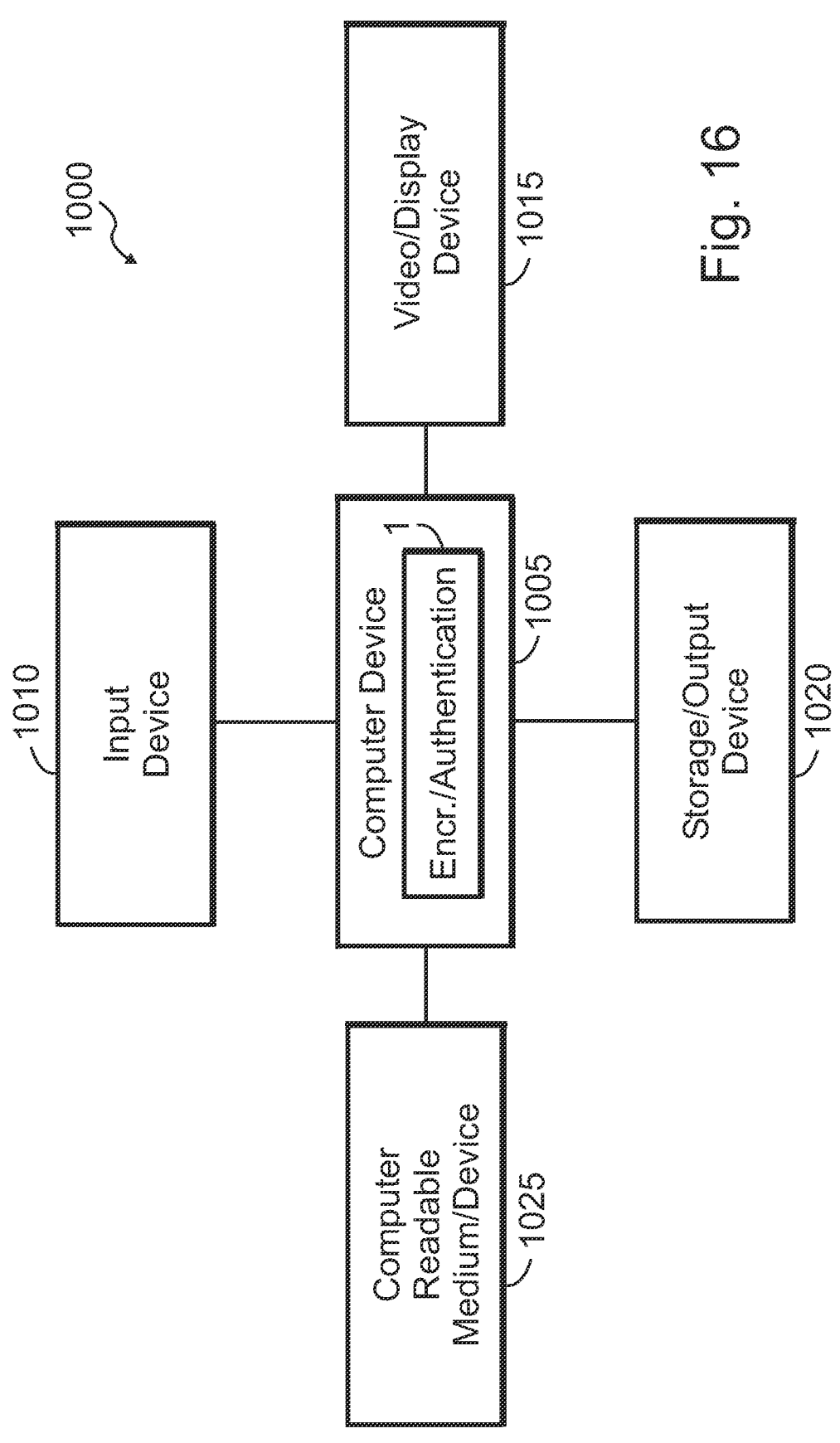
FIGS. 16-18 show block diagrams of systems for information processing, including cryptographic functionality.
Figure 17:
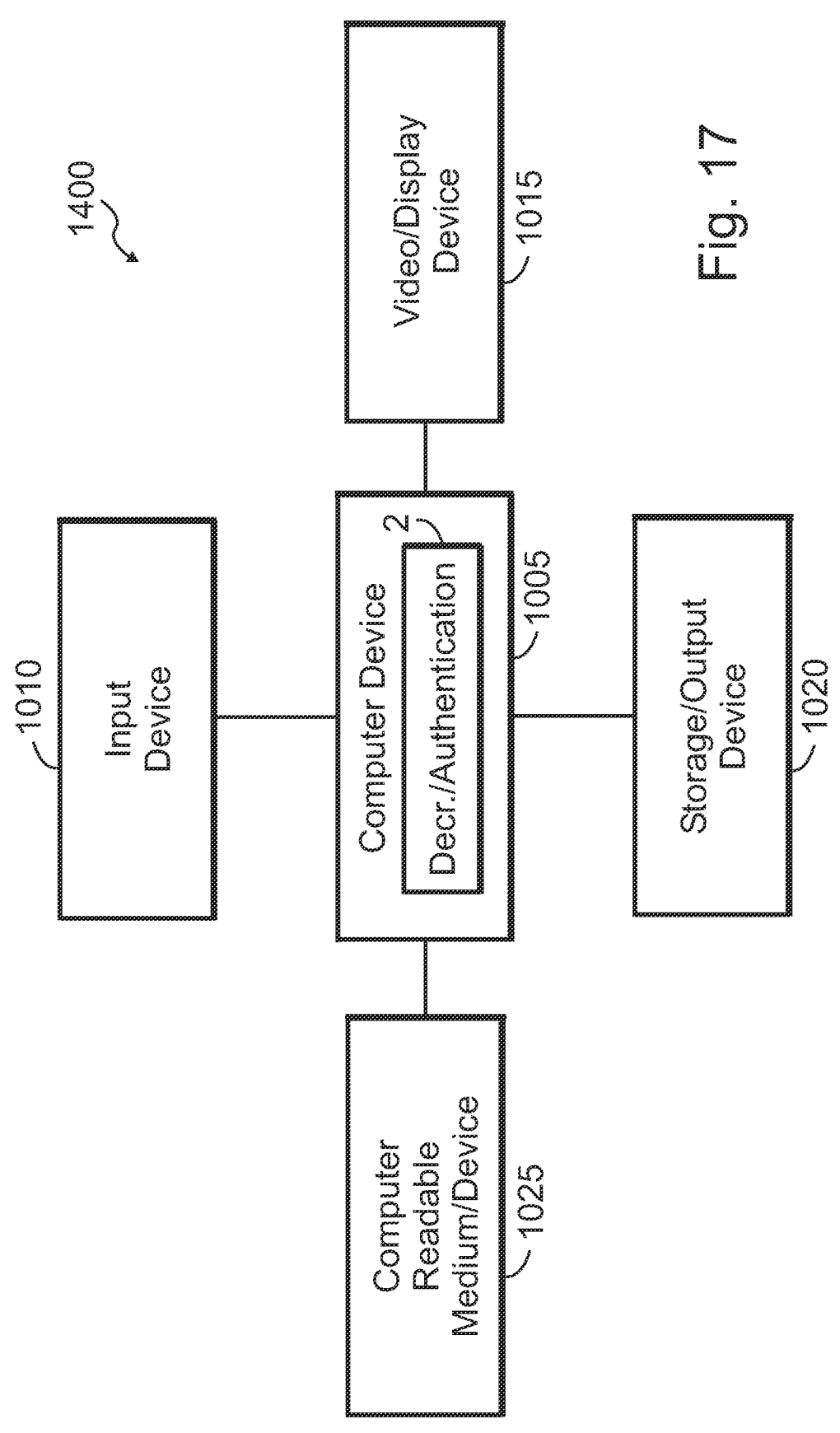
Figure 18:
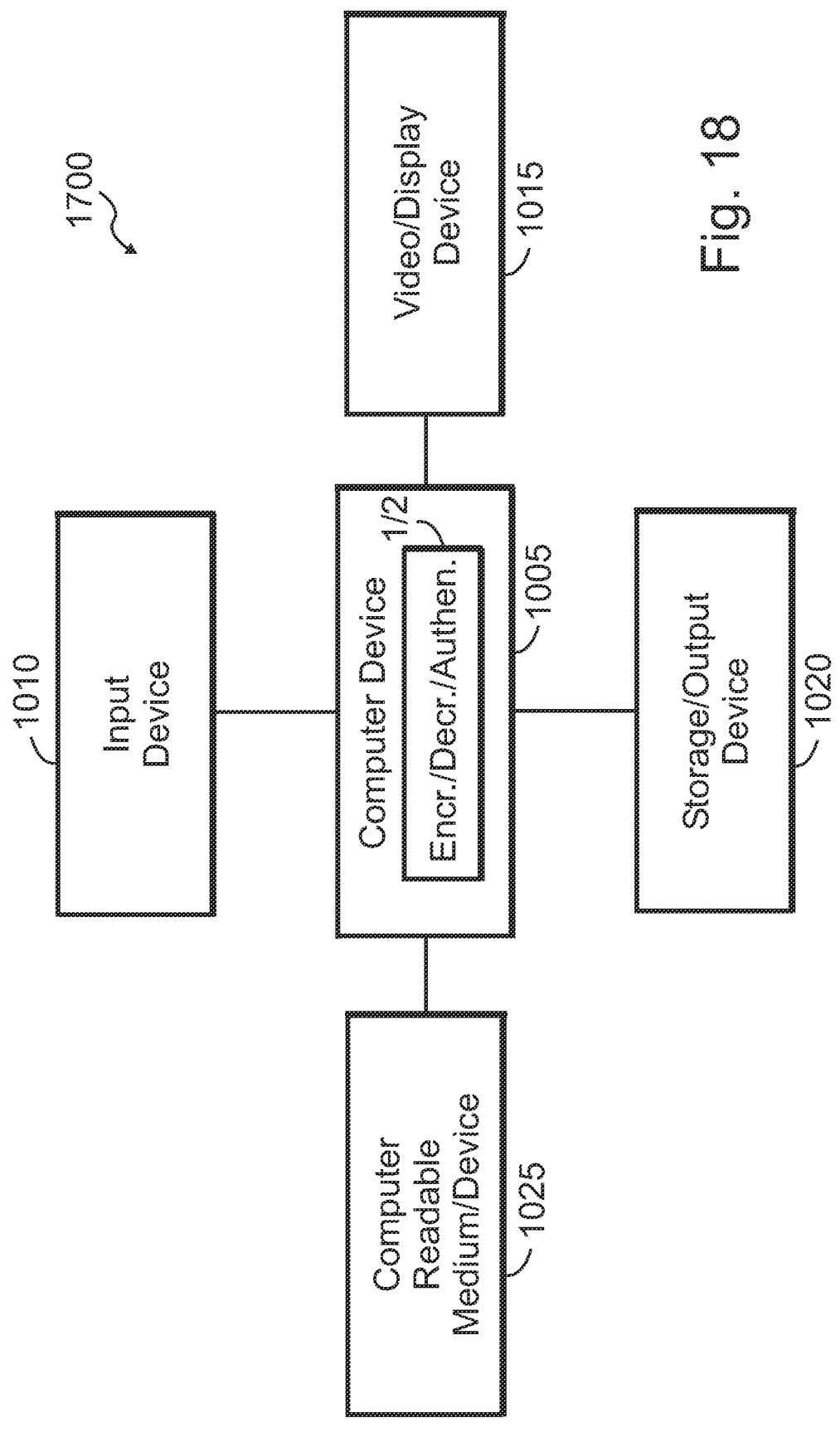

According to one aspect of the disclosure, one may perform, run, or execute the disclosed algorithms, processes, methods, or software on computer systems, devices, processors, controllers, etc. FIGS. 16-18 show block diagrams of systems for information processing, including cryptographic functionality, according to exemplary embodiments.

FIG. 16 shows a block diagram of a system 1000 for processing information according to an exemplary embodiment. For example, in some embodiments, system 1000 may be used to realize or implement cryptographic functionality. System 1000, or modifications or variations of it as persons of ordinary skill in the art will understand, may be used to run or perform processes used in the disclosed concepts, for instance, as used in exemplary embodiments.

System 1000 includes a computer device 1005, an input device 1010, a video/display device 1015, and a storage/output device 1020, although one may include more than one of each of those devices, as desired. Computer device 1005 couples to input device 1010, video/display device 1015, and storage/output device 1020. System 1000 may include more than one computer device 1005, for example, a set of associated computer devices or systems, as desired.

Typically, system 1000 operates in association with input from a user. The user input typically causes system 1000 to perform specific desired information-processing tasks, including cryptographic tasks. System 1000 in part uses computer device 1005 to perform those tasks. Computer device 1005 includes information-processing circuitry, such as a central-processing unit (CPU), controller, microcontroller unit (MCU), etc., although one may use more than one such device or information-processing circuitry, as persons skilled in the art would understand.

In the embodiment shown, the computer device 1005 provides cryptographic functionality. More specifically, the computer device 1005 includes circuitry that may be used to provide encryption and/or authentication functionality, such as described above. The computer device 1005 may include custom cryptographic circuitry to provide specified cryptographic functionality, as desired.

Input device 1010 receives input from the user and makes that input available to computer device 1005 for processing. The user input may include data, instructions, or both, as desired. Input device 1010 may constitute an alphanumeric input device (e.g., a keyboard or keypad), a pointing device (e.g., a mouse, roller-ball, light pen, touch-sensitive apparatus, for example, a touch-sensitive display, or tablet), or both. The user operates the alphanumeric keyboard or keypad to provide text, such as ASCII characters, to computer device 1005. Similarly, the user operates the pointing device to provide cursor position or control information to computer device 1005.

Video/display device 1015 displays visual images to the user. Video/display device 1015 may include graphics circuitry, such as graphics processors, as desired. The visual images may include information about the operation of computer device 1005, such as graphs, pictures, images, and text. Video/display device 1015 may include a computer monitor or display, an electronic display (e.g., a liquid crystal display), a projection device, and the like, as persons of ordinary skill in the art would understand. If system 1000 uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may include a magnetic, optical, semiconductor, or magneto-optical drive capable of storing information on a desired medium and in a desired format. As another example, storage/output device 1020 may constitute a printer, plotter, or other output device to generate printed or plotted expressions of the information from computer device 1005. In some embodiments, in addition or as an alternative to storing information, storage device 1020 may provide information (e.g., previously stored information) to one or more components or parts of system 1000, for example, computer device 1005.

Computer-readable medium 1025 (or computer program product) interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures, databases, and/or file systems). When stored, encoded, recorded, and/or embodied by computer-readable medium 1025, the functional descriptive material imparts functionality. The functional descriptive material interrelates to computer-readable medium 1025. In some embodiments, computer-readable medium 1025 is non-transitory, as desired.

Information structures within the functional descriptive material define structural and functional interrelations between the information structures and computer-readable medium 1025 and/or other aspects of system 1000. These interrelations permit the realization of the information structures' functionality.

Moreover, within such functional descriptive material, computer programs define structural and functional interrelations between the computer programs and computer-readable medium 1025 and other aspects of system 1000. These interrelations permit the realization of the computer programs' functionality. Thus, in a general sense, computer-readable medium 1025 includes information, such as instructions, that when executed by computer device 1005, cause computer device 1005 (system 1000, generally) to provide the functionality prescribed by a process, computer program, software, firmware, method, algorithm, etc., as included (partially or entirely) in computer-readable medium 1025.

By way of illustration, computer device 1005 reads, accesses, or copies functional descriptive material into a computer memory (not shown explicitly in the figure) of computer device 1005 (or a separate block or memory circuit coupled to computer device 1005, as desired). Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional or desired tasks or operations.

Note that one may implement computer-readable medium 1025 in a variety of ways, as persons of ordinary skill in the art would understand. For example, memory within computer device 1005 (and/or external to computer device 1005) may constitute a computer-readable medium 1025, as desired.

Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired. In addition, input(s) and/or output(s) of system 1000 may be received from, or provided to, one or more networks (not shown), as desired.

FIG. 17 shows a block diagram of a system 1000 for processing information according to another exemplary embodiment. The system in FIG. 17 is similar to the system in FIG. 16. In the system 1000 in FIG. 17, the computer device 1005 provides cryptographic functionality. Unlike the encryption functionality in FIG. 16, the computer device 1005 includes circuitry that may be used to provide decryption and/or authentication functionality, such as described above. Similar to the system in FIG. 16, the computer device 1005 in FIG. 17 may include custom cryptographic circuitry to provide specified cryptographic functionality, as desired.

FIG. 18 shows a block diagram of a system 1000 for processing information according to another exemplary embodiment. The system in FIG. 18 is similar to the systems in FIGS. 16-17. In the system 1000 in FIG. 18, the computer device 1005 provides cryptographic functionality. Unlike the encryption functionality in FIGS. 16-17, the computer device 1005 includes circuitry that may be used to provide encryption, decryption, and/or authentication functionality, such as described above. Similar to the systems in FIGS. 16-17, the computer device 1005 in FIG. 18 may include custom cryptographic circuitry to provide specified cryptographic functionality, as desired.

Figure 19:
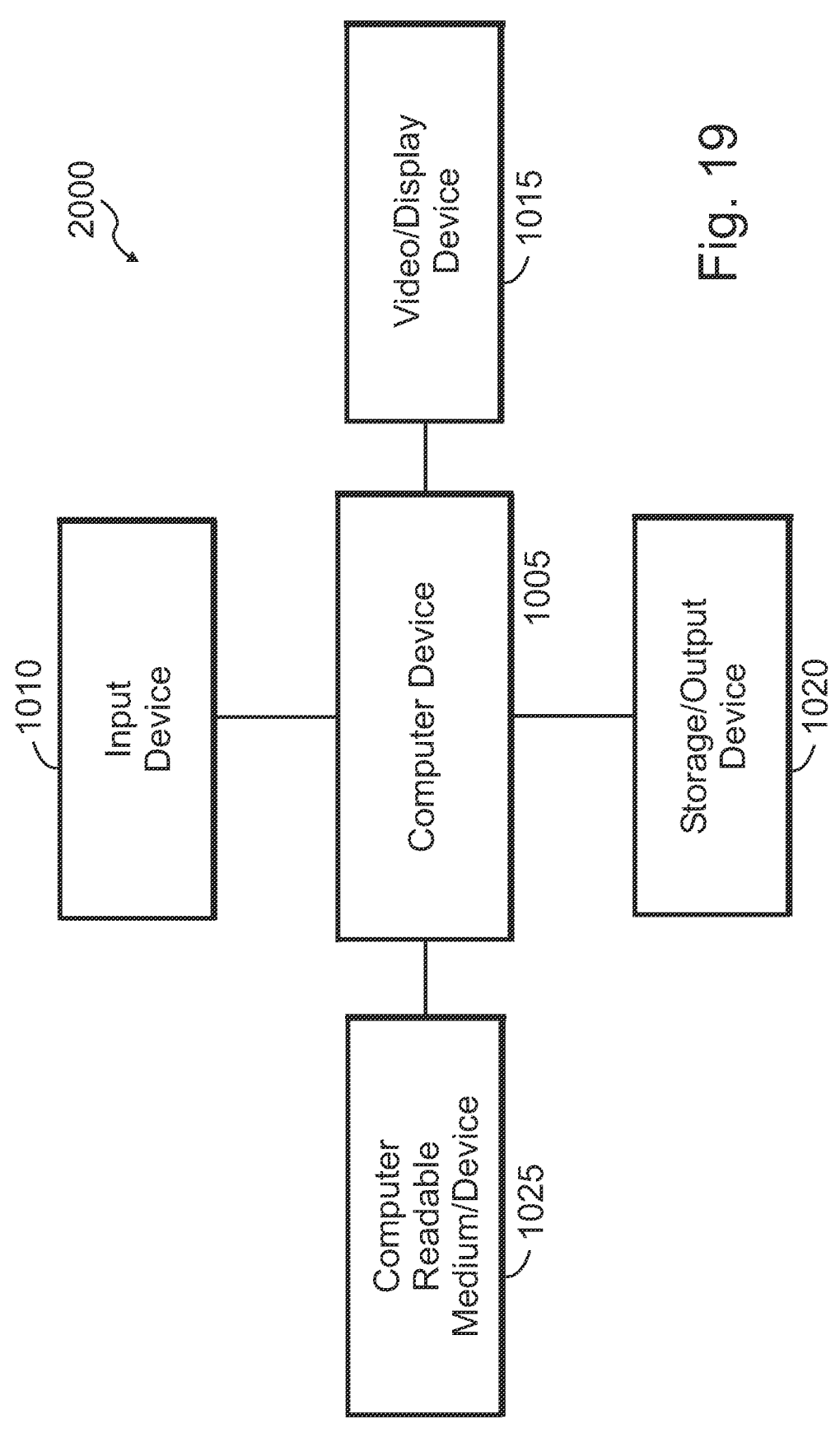
FIG. 19 shows a block diagram of a system for information processing.

FIG. 19 shows a block diagram of a system 1000 for information processing according to another exemplary embodiment. The system in FIG. 19 is similar to the systems in FIGS. 16-19 in that the computer device 1005 provides cryptographic functionality. The system 1000 in FIG. 19, however, uses a general computer device 1005 (e.g., no custom circuitry, for example, for cryptographic functions). In other words, the computer device 1005 in FIG. 19 has general-purpose computing capabilities. The user may program the computer device 1005 (using, for example, the computer readable medium/device 1025, the input device 1010, etc.) to perform desired cryptographic functionality, as described above. Thus, the system 1000 may be programmed to provide encryption, decryption, and/or authentication functionality, as desired.

Some of the exemplary embodiments have been described with reference to ChaCha20 and/or Poly1305. The ChaCha20 and Poly1305 constructs have specific characteristics, such as number of bits used for blocks, etc. Those characteristics, as referenced in connection with various embodiments, are exemplary and for illustration purposes, for example, as regards RFC 8439. Cryptographic functionality (encryption, decryption, and/or authentication) using different characteristics (e.g., different number of bits for keys, blocks, etc.) are possible and are contemplated as within the scope of disclosure, and may be implemented by making appropriate modifications, as persons of ordinary skill in the art will understand. The choice of characteristics depend on a number of factors, such as available technology, design and performance specifications, processing power/speed, amount of storage and memory available, user preferences, etc., as persons of ordinary skill in the art will understand.

Various circuits and blocks described above and used in exemplary embodiments may be implemented in a variety of ways and using a variety of circuit elements or blocks. For example, the circuitry shown in FIGS. 4-5, 7-1 through 7-3, 8, and 13-19 may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
an encryption circuit comprising:
a block function circuit configured to generate a plurality of blocks of output data,
wherein a hash key value and a first part of a keystream are generated from a block of output data having an initial sequence number, and
wherein a second part of the keystream is generated from blocks of output data having sequence numbers other than the initial sequence number.

2. The apparatus according to claim 1, wherein the encryption circuit comprises an authenticated encryption with associated data (AEAD) circuit.

3. The apparatus according to claim 2, further comprising:
an authentication circuit configured to generate a tag based on input data and associated data,
wherein the input data is based on the keystream and the associated data includes the hash key value.

4. The apparatus according to claim 3, wherein the authentication circuit comprises a finite state machine (FSM) configured to generate the tag based on the hash key value and based on ciphertext generated using the keystream.

5. The apparatus according to claim 2, further comprising:
an authentication circuit,
wherein the authentication circuit comprises a Poly 1305 authenticator configured to generate a tag based on the hash key value and based on ciphertext generated using the keystream and plaintext.

6. The apparatus according to claim 1, wherein the block function circuit generates the plurality of blocks of output data based on a constant, a key, and a nonce.

7. The apparatus according to claim 1, wherein the block function circuit comprises a finite state machine (FSM).

8. The apparatus according to claim 1,
wherein the block function circuit provides a ChaCha20 block function, and
wherein the block of output data having the initial sequence number includes more state than used by the ChaCha20 block function.

9. The apparatus according to claim 1, wherein the hash key value includes a first partial hash key value and a second partial hash key value and the block function circuit is configured to deconstruct the block of output data having the initial sequence number into the first partial hash key value, the second partial hash key value, and the first part of the keystream.

10. The apparatus according to claim 9, wherein the apparatus further comprises an authenticator circuit configured to generate a tag by using the first partial hash key value in a modular multiply with an accumulator value based on the keystream to generate an updated accumulator value and by adding the second partial hash key value to the updated accumulator value.

11. An apparatus, comprising:
an encryption circuit comprising:
a block function circuit configured to use ChaCha20 block functionality to generate a plurality of blocks of output data having respective sequence numbers; and
a finite state machine (FSM) configured to generate a hash key value and a first part of a keystream from a block of output data having an initial sequence number, and to generate a second part of the keystream from blocks of output data having sequence numbers greater than the initial sequence number.

12. The apparatus according to claim 11, wherein the encryption circuit comprises an authenticated encryption with associated data (AEAD) circuit.

13. The apparatus according to claim 11, further comprising an authentication circuit that generates a tag based on input data and associated data.

14. The apparatus according to claim 11, further comprising:

an authentication circuit, wherein the authentication circuit comprises a Poly 1305 authenticator configured to generate a tag based on the hash key value and based on ciphertext generated using the keystream and plaintext.

15. The apparatus according to claim 11, wherein the block function circuit generates the plurality of blocks of output data based on a constant, a key, and a nonce.

16. A method of encrypting information, the method comprising:

using a block function to generate a plurality of blocks of output data;

generating a hash key value and a first part of a keystream from a block of output data having an initial sequence number; and generating a second part of the keystream from blocks of output data having sequence numbers other than the initial sequence number.

17. The method according to claim 16, wherein encrypting information comprises an authenticated encryption with associated data (AEAD) operation.

18. The method according to claim 16, further comprising authenticating information by generating a tag based on input data and associated data, wherein the input data is based on the keystream and the associated data includes the hash key value.

19. The method according to claim 18, further comprising:

generating ciphertext using the keystream and plaintext, wherein authenticating information by generating the tag based on input data and associated data comprises using a Poly 1305 authenticator to generate the tag based on the hash key value and the ciphertext.

20. The method according to claim 16, wherein using the block function to generate the plurality of blocks of output data comprises using a ChaCha20 block function.

21. The method according to claim 16, wherein using the block function to generate the plurality of blocks of output data comprises using a constant, a key, and a nonce.

* * * * *